US009348081B2

(12) United States Patent
Yuki et al.

(10) Patent No.: US 9,348,081 B2
(45) Date of Patent: May 24, 2016

(54) ILLUMINATION DEVICE AND DISPLAY DEVICE

(75) Inventors: Ryuzo Yuki, Osaka (JP); Takeshi Ishida, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 291 days.

(21) Appl. No.: 14/130,529

(22) PCT Filed: Jun. 15, 2012

(86) PCT No.: PCT/JP2012/065364
§ 371 (c)(1),
(2), (4) Date: Jan. 2, 2014

(87) PCT Pub. No.: WO2013/005559
PCT Pub. Date: Jan. 10, 2013

(65) Prior Publication Data
US 2014/0146561 A1 May 29, 2014

(30) Foreign Application Priority Data

Jul. 6, 2011 (JP) ................................. 2011-150279

(51) Int. Cl.
*F21V 8/00* (2006.01)
*G02F 1/1335* (2006.01)

(52) U.S. Cl.
CPC ............ *G02B 6/0033* (2013.01); *G02B 6/0035* (2013.01); *G02B 6/0053* (2013.01); *G02B 6/0018* (2013.01); *G02B 6/0036* (2013.01); *G02F 1/133615* (2013.01)

(58) Field of Classification Search
CPC ... G02B 6/0033; G02B 6/0035; G02B 6/0053
See application file for complete search history.

(56) References Cited

U.S. PATENT DOCUMENTS

| 2004/0130882 A1 | 7/2004 | Hara et al. |
| 2005/0180166 A1 | 8/2005 | Hara et al. |
| 2005/0180719 A1 | 8/2005 | Hara et al. |
| 2005/0180720 A1 | 8/2005 | Hara et al. |

(Continued)

FOREIGN PATENT DOCUMENTS

| JP | 2005-129271 A | 5/2005 |
| JP | 2009-164100 A | 7/2009 |

(Continued)

OTHER PUBLICATIONS

Official Communication issued in International Patent Application No. PCT/JP2012/065364, mailed on Sep. 4, 2012.

*Primary Examiner* — David V Bruce
(74) *Attorney, Agent, or Firm* — Keating & Bennett, LLP

(57) ABSTRACT

Provided is an illumination device capable of improved illumination quality. This back-light unit (illumination device) (20) is provided with a light source, and a light guide (23) which guides light from the light source. The light guide (23) includes an incidence surface (light incidence surface (23*a*)) where light from the light source is incident, an end region (22*b*) on the light source side, and a light emitting region (22*a*) arranged on the side opposite of the light source with respect to the end region (22*b*). Prisms (23*e*) which reflect the light entering the light guide (23) are provided in the light emitting region of the light guide (23). These prisms (23*e*) are configured to begin from a position (L1) separated by a predetermined distance (D30) from the light incidence surface (23*a*) in the end region (22*b*).

11 Claims, 28 Drawing Sheets

(56) References Cited

U.S. PATENT DOCUMENTS

2008/0212339 A1 9/2008 Hara et al.
2009/0147532 A1 6/2009 Taya et al.
2011/0299013 A1* 12/2011 Ishida .................. G02B 6/0038
349/65

FOREIGN PATENT DOCUMENTS

| JP | 2009-176593 A | 8/2009 | |
| JP | 2010-217637 A | 9/2010 | |
| JP | WO 2010100784 A1 * | 9/2010 | ........... G02B 6/0038 |
| WO | 2010/100784 A1 | 9/2010 | |

* cited by examiner

FIG.15
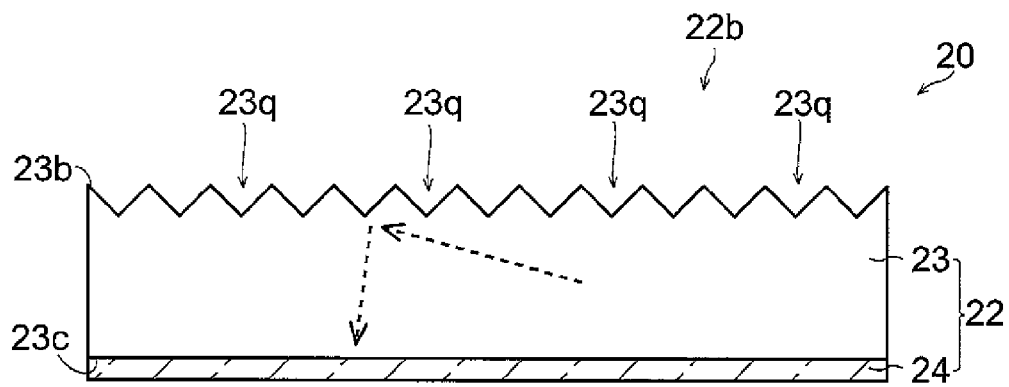
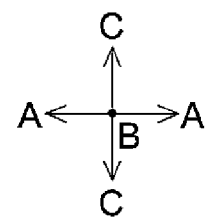
FIG.16
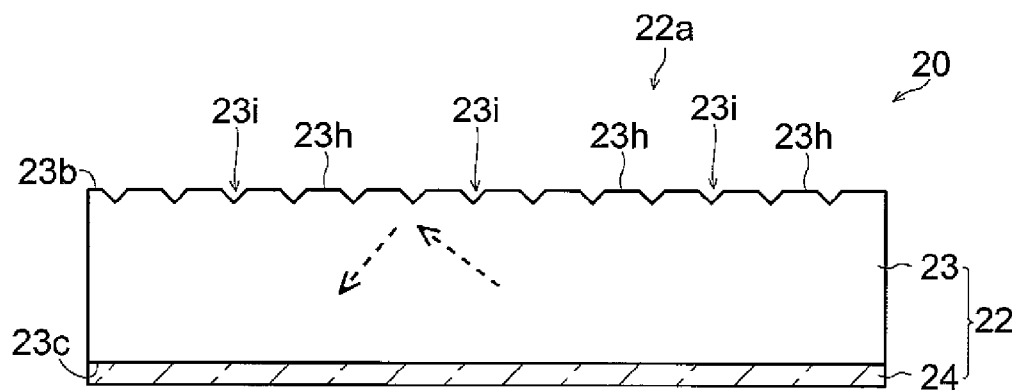
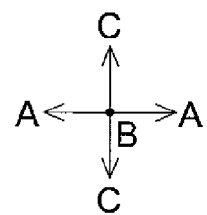

FIG.18
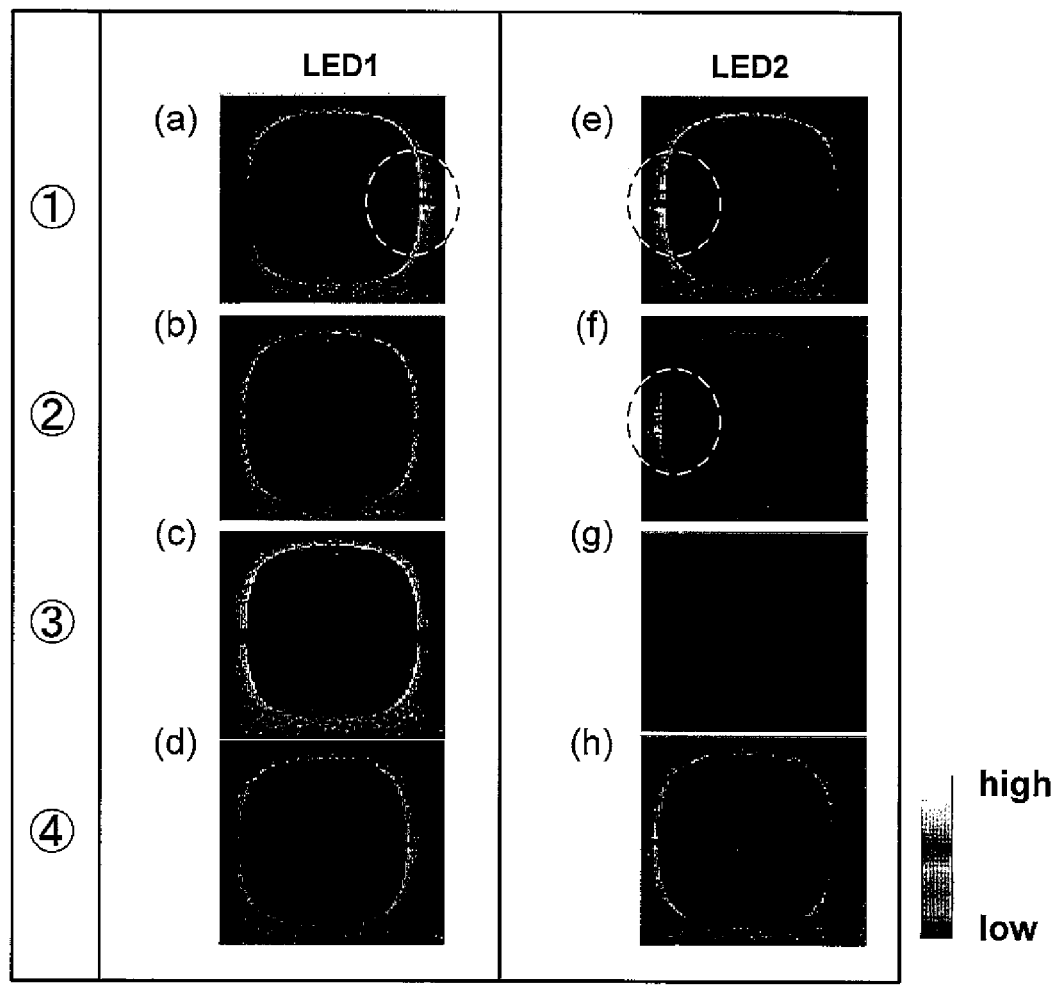
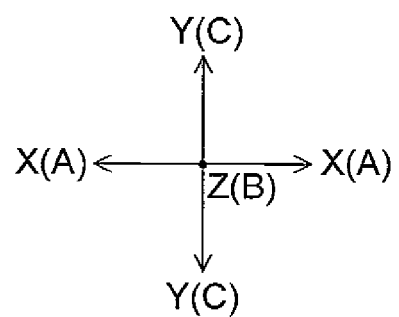

FIG.19
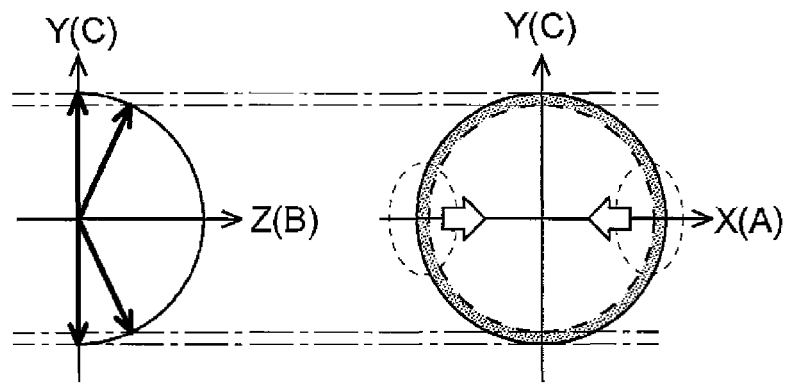
FIG.20A
INITIAL STATE
FIG.20B
STATE IN LIGHT EMITTING REGION
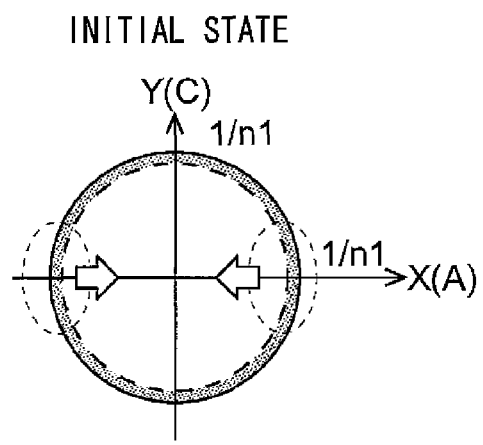 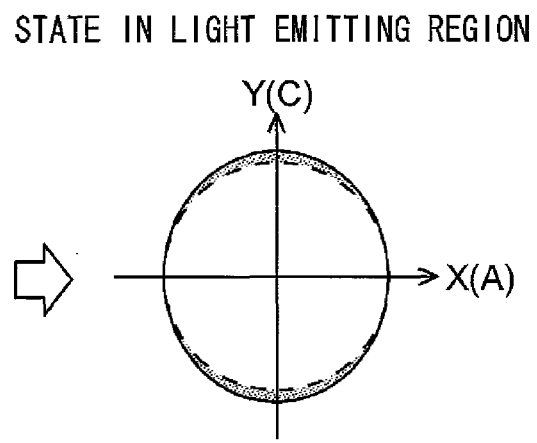
FIG.21
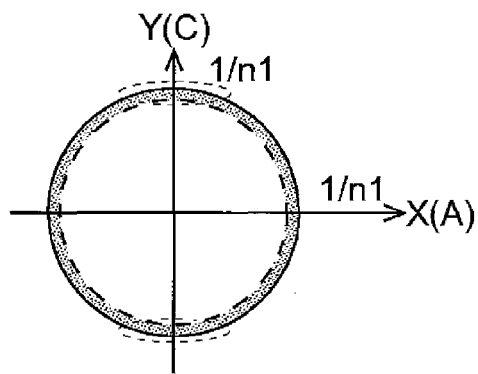

ILLUMINATION DEVICE AND DISPLAY DEVICE

TECHNICAL FIELD

The present invention relates to an illumination device and a display device. In particular, the present invention relates to an illumination device equipped with a light guide member for guiding light, and to a display device including the illumination device.

BACKGROUND ART

A liquid crystal display device (display device) including a non-light emission liquid crystal display panel (display panel) is usually equipped also with a back-light unit (illumination device) for supplying light to the liquid crystal display panel. The back-light unit is preferably configured to generate planar light that illuminates the entire area of the planar liquid crystal display panel. Therefore, the back-light unit mounted in the liquid crystal display device may include a light guide plate (light guide member) for mixing light from internal light sources at high degree.

As a back-light unit including a light guide plate, there is known an edge light (side light) type back-light unit, for example. The edge light type back-light unit usually has a structure in which light sources such as light emitting diodes (LEDs) are arranged on a side face of the light guide plate. In the back-light unit having this structure, light emitted from the light sources enters through the side face of the light guide plate to the inside of the light guide plate, and the incident light is guided inside the light guide plate and is emitted to the liquid crystal display panel.

An example of this back-light unit is described in Patent Document 1, for example.

PRIOR ART DOCUMENTS

Patent Documents

Patent Document 1: JP-A-2009-164100

DISCLOSURE OF THE INVENTION

Problem to be Solved by the Invention

Here, if a point light source such as an LED is used as the light source in the edge light type back-light unit, it is difficult to uniformly supply light to a wide light guide plate. Therefore, the back-light unit using an LED as the light source has difficulty in emitting light uniformly and efficiently in a region (light emitting region) corresponding to a display area of the liquid crystal display panel, and hence has a problem that illumination quality is deteriorated.

The present invention is made to solve the above-mentioned problem, and it is an object of the present invention to provide an illumination device capable of improving illumination quality and a display device including the illumination device.

Means for Solving the Problem

In order to achieve the above-mentioned object, an illumination device according to a first aspect of the present invention includes a light source and a light guide for guiding light from the light source. The light guide includes an incidence surface where light from the light source enters, an end region on the light source side, and a light emitting region arranged on the side opposite to the light source with respect to the end region. In addition, the light emitting region of the light guide is provided with a first reflection portion for reflecting light entering the inside of the light guide. Further, this first reflection portion is configured to begin from a position separated by a predetermined distance from the incidence surface in the end region.

The illumination device according to this first aspect can improve luminance in the light emitting region because the light emitting region is provided with the first reflection portion as described above. Here, a boundary between an area with the first reflection portion and an area without the first reflection portion is easily visually recognized because luminance is different between the areas. Therefore, in the first aspect, the first reflection portion is configured to begin from the end region. Thus, the boundary between the area with the first reflection portion and the area without the first reflection portion is in the end region, and is not included in the light emitting region. Therefore, the boundary cannot be visually recognized, and it is possible to emit light uniformly from the light emitting region.

In addition, because the first reflection portion is configured to begin from a position separated by a predetermined distance from the incidence surface in the end region, it is possible to reduce emitting light intensity in the end region compared with a case where the first reflection portion is configured to begin from the incidence surface, for example. Therefore, it is possible to reduce light loss.

In this way, in the first aspect, the light emitting region can uniformly and efficiently emit light. Therefore, it is possible to provide an illumination device having good illumination quality.

In the illumination device according to the first aspect, it is preferred that the region closer to the light source than the first reflection portion in the end region should have a different structure from the light emitting region. The "different structure from the light emitting region" includes a case where a reflection portion different from the first reflection portion is formed in the region closer to the light source than the first reflection portion in the end region, and a case of a flat surface state (to be a flat surface portion) without a reflection portion.

In addition, in the illumination device according to the first aspect, a rear side of the light guide may be provided with a second reflection portion. In this case, it is preferred that a beginning position of the second reflection portion should be closer to the light source than the first reflection portion. With this structure, light that may cause unevenness of luminance can be reflected by the second reflection portion so as to emit from the end region. Therefore, it is possible to prevent such light from being guided by the light emitting region to emit from the light emitting region. In other words, it is possible to prevent the light that may cause unevenness of luminance from emitting from the light emitting region. Thus, it is possible to prevent occurrence of unevenness of luminance.

In the illumination device according to the first aspect, it is more preferred that the light emitting region should be provided with a third reflection portion for expanding light in a direction intersecting the incident direction of the light, and that the region closer to the light source than the first reflection portion in the end region should be provided with a fourth reflection portion for changing a propagation angle of the light expanding in the direction intersecting the incident direction of the light more largely than the third reflection portion. With this structure, the light from the light source entering the light guide can be reflected by the fourth reflection portion. The fourth reflection portion changes the propagation angle of the light expanding in the direction intersecting the incident direction of the light more largely than the third reflection portion. Therefore, the expansion of the light in the direction intersecting the incident direction can be suppressed by the fourth reflection portion. Here, a V-shaped bright line is apt to occur in the end region of the light guide. This V-shaped bright line is caused by light expanding laterally inside the light guide. Therefore, by suppressing expansion of light in the direction intersecting the incident direction, it is possible to effectively suppress occurrence of the V-shaped bright line. Further, by suppressing occurrence of the V-shaped bright line, light becoming the V-shaped bright line can be effectively used. Thus, it is possible to effectively improve use efficiency of light and luminance.

In order to suppress occurrence of the V-shaped bright line, it is effective to suppress expansion of light in the direction intersecting the incident direction. However, if the expansion of light is excessively suppressed, linear unevenness (linear light unevenness extending in the incident direction) occurs. Therefore, the third reflection portion is formed in the light emitting region. Compared with the fourth reflection portion, the third reflection portion has a smaller effect of changing the propagation angle of light expanding in the direction intersecting the incident direction of the light. In other words, it expands light in the direction intersecting the incident direction of the light. Therefore, in the light emitting region, the light can be appropriately diffused by the third reflection portion. Thus, it is possible to suppress occurrence of linear unevenness. Note that it is preferred that the third reflection portion is configured to begin from the position separated by a predetermined distance from the incidence surface in the end region similarly to the first reflection portion.

In this way, by forming the third reflection portion and the fourth reflection portion in the light guide, it is possible to suppress occurrence of the V-shaped bright line and the linear unevenness. Therefore, unevenness of luminance can be effectively improved, and hence it is possible to provide high quality planar light having good uniformity.

In addition, the third reflection portion and the fourth reflection portion of the light guide can be formed to be continuous to each other. In this case, it is preferred that the third reflection portion and the fourth reflection portion should extend continuously in a direction substantially perpendicular to the incidence surface in a plan view and have a recess including an inclined surface, and that a depth of the recess becomes larger as being closer to the incidence surface. With this structure, too, occurrence of the V-shaped bright line and the linear unevenness can be effectively suppressed.

It is more preferred that a reflection layer for reflect light emitted externally from the fourth reflection portion is formed on the fourth reflection portion. With this structure, light emitted to an air layer can be reflected by the reflection layer to enter the light guide. Thus, light loss can be reduced so that light use efficiency can be improved.

In this case, it is preferred that the reflection layer should be formed to cover the entire or a part of the surface of the end region of the light guide on the light source side, for example. In other words, it is preferred that the reflection layer should be formed so as to cover at least a part of the fourth reflection portion (for example, the end region on the light source side).

In the illumination device according to the first aspect, it is preferred to dispose a light guide member including a light guide and a low refractive layer having a smaller refractive index than the light guide. In this case, it is preferred that the low refractive layer is formed on a rear surface of the light guide without an air layer between them. In addition, it is preferred that a plurality of first reflection portions should be formed on a front surface side or on the rear surface of the light guide, and a plurality of second reflection portions should be formed on the rear surface of the light guide member. Further, in this case, it is preferred that the first reflection portions should be formed to have a function of gradually decreasing an incident angle of light from the light source to the rear surface of the light guide, and it is preferred that the second reflection portions should be formed to have a function of totally reflecting the light from the light source frontward at an interface between the rear surface of the light guide member and the air layer.

In this way, the plurality of first reflection portions for gradually decreasing the incident angle of the light from the light source to the rear surface of the light guide are formed on the front surface side or on the rear surface of the light guide, and the plurality of second reflection portions for totally reflecting the light from the light source frontward at the interface between the rear surface of the light guide member and the air layer are formed on the rear surface of the light guide member. Thus, the light from the light source is repeatedly reflected between a front surface side portion and the rear surface of the light guide so as to be guided, and hence the incident angle of the light to the rear surface of the light guide is gradually decreased. Further, when the incident angle of the light to the rear surface of the light guide becomes smaller than a critical angle between the light guide and the low refractive layer, the light from the light source enters the low refractive layer. Therefore, an expansion angle of the light entering the low refractive layer is decreased, and an expansion angle of the light reflected by the interface between the rear surface of the light guide member and the air layer is also decreased. Thus, an expansion angle of the light emitted from the light guide member can be decreased. As a result, light condensing characteristics can be also improved. In addition, luminance can also be improved.

In addition, with this structure, the light condensing characteristics and luminance can be improved without disposing a plurality of optical sheets such as a condensing lens on the light guide member. Therefore, it is not necessary to dispose the optical sheets. Thus, by adopting a structure without the optical sheets, it is possible to achieve a thinner illumination device and reduction of manufacturing cost. Further, by adopting the structure without the optical sheets, there is no loss of light passing through the optical sheets (for example, light loss due to multiple reflections among the sheets). Thus, use efficiency of light can be improved.

In addition, when the first reflection portion is disposed on the front surface side or the rear surface of the light guide, the light from the light source is reflected between the front surface side portion and the rear surface of the light guide so as to be guided, and the incident angle of the light to the rear surface of the light guide becomes smaller as being farther from the light source. Therefore, as being farther from the light source, the light from the light source can enter the low refractive layer more easily. Therefore, it is possible to achieve uniform amount of light entering the low refractive layer between a portion having large light amount (many light rays) close to the light source and a portion having small light amount (a few light rays) away from the light source. As a result, it is possible to achieve uniform light emission from the light guide member. In addition, luminance can also be uniformed.

Further, by disposing the plurality of second reflection portions for reflecting the light from the light source frontward on the rear surface of the light guide member, the light can be uniformly reflected by this second reflection portion. Thus, it is possible to suppress occurrence of dot unevenness and to achieve more uniform luminance. Further, it is preferred that the second reflection portion should be formed on substantially the entire rear surface of the light guide member, so that the light can be emitted more uniformly from the entire light emitting region of the light guide member.

Because the plurality of first reflection portions have a function of totally reflecting the light from the light source, it is possible to prevent the light entering from the light guide to the low refractive layer from emitting from the rear surface of the light guide member so that occurrence of light loss can be suppressed. In addition, because the second reflection portion totally reflects the light, light absorption by the second reflection portion is suppressed. Thus, use efficiency of light can be improved more.

Further, with this structure, unevenness of luminance such as the V-shaped bright line or the linear unevenness is apt to occur. However, because the light guide is provided with the first reflection portion and the second reflection portion, occurrence of the V-shaped bright line and the linear unevenness can be effectively suppressed. Therefore, it is possible to improve the use efficiency of light and luminance while suppressing occurrence of the unevenness of luminance. In addition, it is also possible to realize thinner device and lower cost. In addition, with this structure, the boundary between the region with the first reflection portion and the region without the first reflection portion is easily visually recognized. However, by forming the first reflection portion to begin from the end region, the region cannot be included in the light emitting region. Thus, it is possible that the boundary is not visually recognized, and hence illumination quality can be improved.

In addition, in the illumination device according to the first aspect, it is possible to adopt a structure including an optical sheet overlapped on the light guide. In this case, it is preferred that the optical sheet has a prism surface, and that the prism surface is disposed to face the light guide. With this structure, it is possible to reduce the number of optical sheets while improving the luminance. On the other hand, with this structure, the V-shaped bright line and the linear unevenness are apt to occur. However, because the light guide is provided with the first reflection portion and the second reflection portion, occurrence of the V-shaped bright line and the linear unevenness can be effectively suppressed.

In the illumination device according to the first aspect, the front surface and the rear surface of the light guide can be formed to be substantially parallel to each other.

A display device according to a second aspect of the present invention includes the illumination device according to the first aspect and a display panel which receives light from the illumination device. With this structure, it is possible to provide the display device having high display quality in which unevenness of luminance is suppressed.

Effects of the Invention

As described above, according to the present invention, it is possible to easily provide an illumination device that can improve illumination quality and a display device equipped with the illumination device.

BRIEF DESCRIPTION OF THE DRAWINGS

FIG. 15 is a cross-sectional view schematically illustrating the light guide plate of the back-light unit according to the first embodiment of the present invention (a diagram for explaining reflection of light at the end region).

FIG. 16 is a cross-sectional view schematically illustrating the light guide plate of the back-light unit according to the first embodiment of the present invention (a diagram for explaining reflection of light in the light emitting region).

FIG. 18 is a diagram illustrating light angle distribution in each region illustrated in FIG. 17.

FIG. 19 is a diagram illustrating emitting light angle distribution from an LED.

FIG. 20 is a diagram illustrating light angle distribution in the light guide plate.

FIG. 21 is a diagram illustrating light angle distribution in the light guide plate.

BEST MODE FOR CARRYING OUT THE INVENTION

Now, embodiments of the present invention are described in detail with reference to the drawings.

First Embodiment

Figure 1:
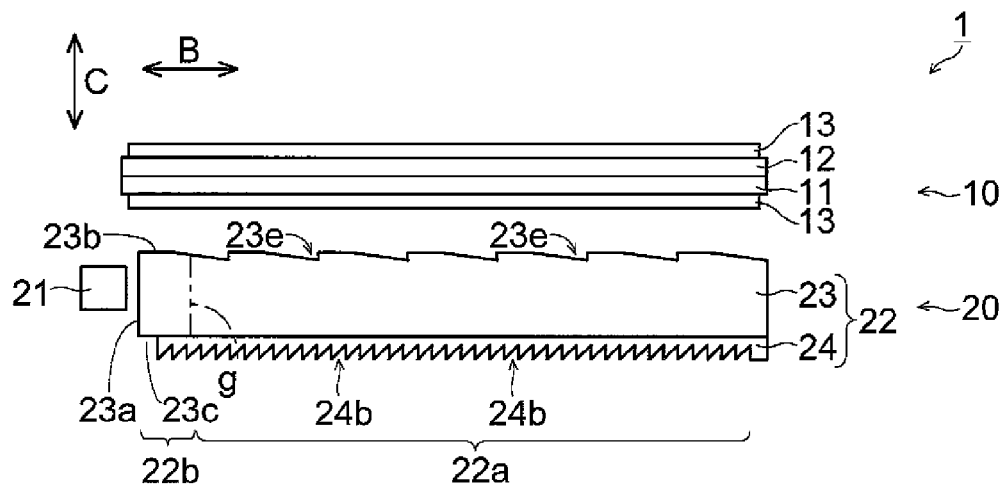
FIG. 1 is a side view of a liquid crystal display device equipped with a back-light unit according to a first embodiment of the present invention.
Figure 2:
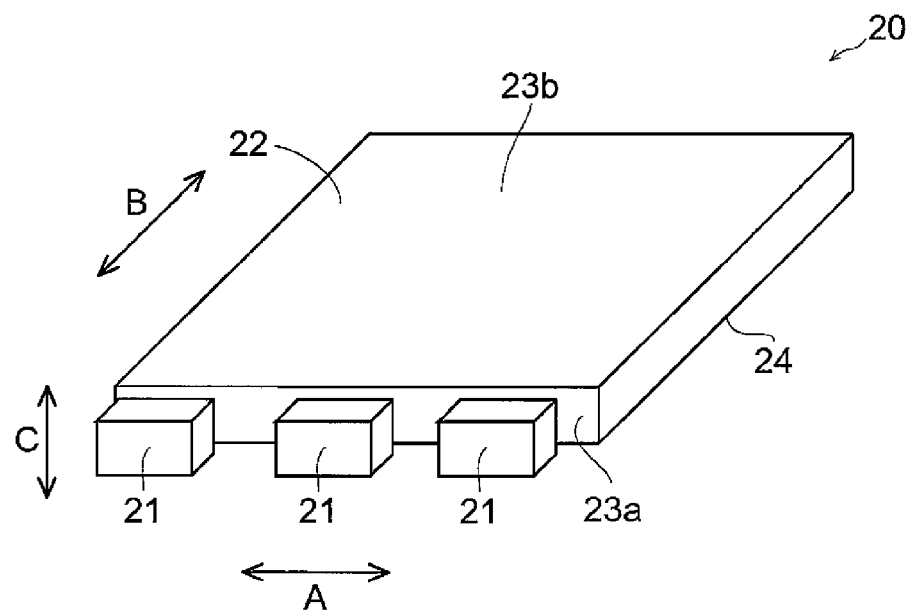
FIG. 2 is a perspective view schematically illustrating the back-light unit according to the first embodiment of the present invention.
Figure 3:
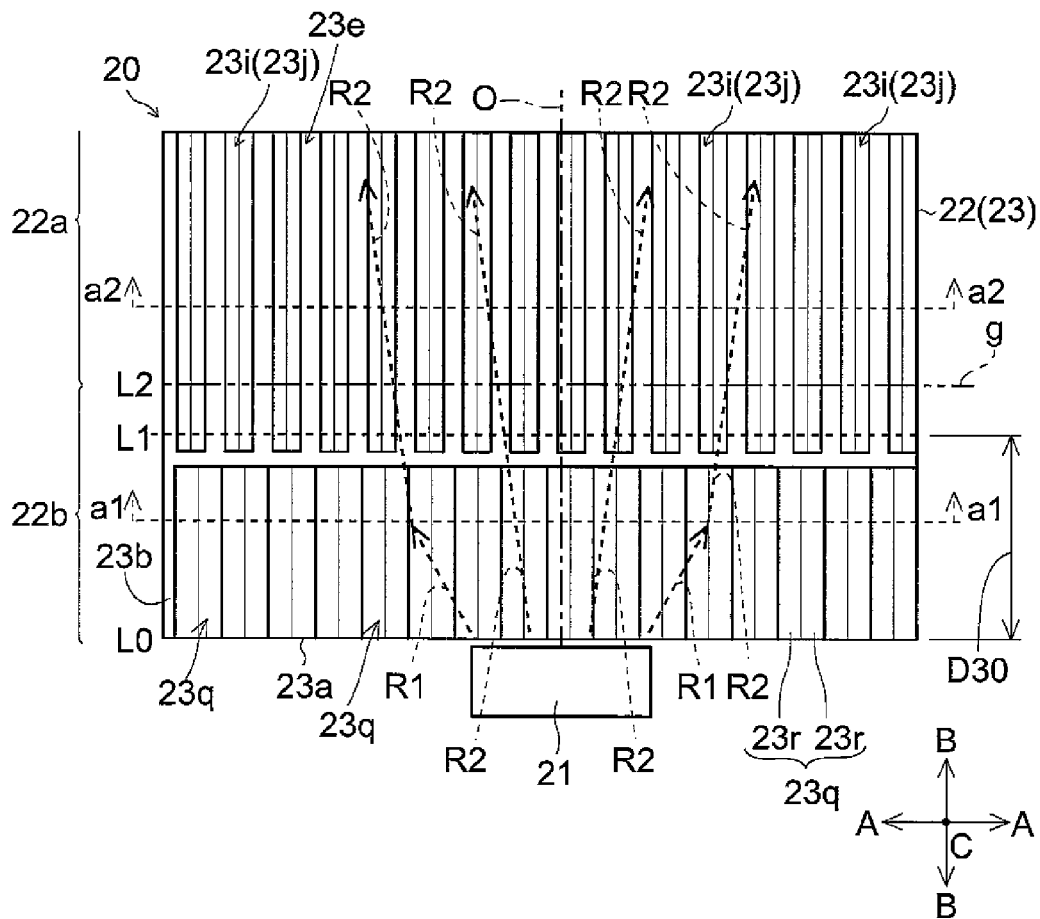
FIG. 3 is a plan view schematically illustrating a part of the back-light unit according to the first embodiment of the present invention.

FIG. 1 is a side view of a liquid crystal display device equipped with a back-light unit according to a first embodiment of the present invention. FIG. 2 is a perspective view schematically illustrating the back-light unit according to the first embodiment of the present invention. FIG. 3 is a plan view schematically illustrating a part of the back-light unit according to the first embodiment of the present invention. FIGS. 4 to 29 are diagrams for explaining the back-light unit according to the first embodiment of the present invention. First, with reference to FIGS. 1 to 29, the back-light unit according to the first embodiment of the present invention and the liquid crystal display device equipped with the back-light unit are described.

As illustrated in FIG. 1, a liquid crystal display device 1 according to the first embodiment includes a liquid crystal display panel 10, a back-light unit 20 disposed on the rear side of the liquid crystal display panel 10, and a frame (not shown) for housing the liquid crystal display panel 10 and the back-light unit 20. Note that the liquid crystal display device 1 is an example of the "display device" of the present invention, and the liquid crystal display panel 10 is an example of the "display panel" of the present invention. In addition, the back-light unit 20 is an example of the "illumination device" of the present invention.

The liquid crystal display panel 10 is constituted, for example, by gluing an active matrix substrate 11 including switching elements such as thin film transistors (TFTs) to an opposing substrate 12 that is opposed to the active matrix substrate 11 with a sealing material (not shown). In addition, liquid crystal (not shown) is filled between the substrates 11 and 12. Further, polarizing films 13 are disposed on a light receiving surface of the active matrix substrate 11 and a light emitting surface of the opposing substrate 12.

The liquid crystal display panel 10 constituted in this manner displays an image by utilizing transmittance change due to inclination of liquid crystal molecules.

Figure 4:
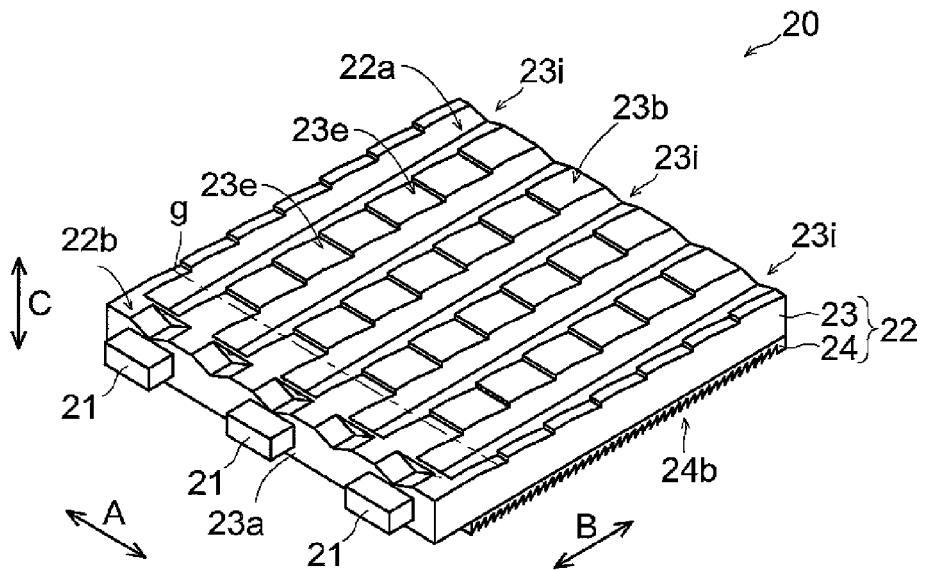
FIG. 4 is a perspective view schematically illustrating the back-light unit according to the first embodiment of the present invention.

The back-light unit 20 according to the first embodiment is an edge light type back-light unit. This back-light unit 20 includes an LED 21 as a light source and a light guide plate 22 for guiding light from the LED 21 as illustrated in FIGS. 1, 2 and 4. The back-light unit 20 includes a plurality of the LEDs 21, which are arranged in an A direction (for example, in a width direction of the light guide plate 22 as illustrated in FIG. 2). Note that the light guide plate 22 is an example of the "light guide member" of the present invention.

In the first embodiment, an optical sheet such as a condensing lens is not disposed between the light guide plate 22 of the back-light unit 20 and the liquid crystal display panel 10 as illustrated in FIG. 1. In other words, the back-light unit 20 of the first embodiment is a sheetless backlight.

The light guide plate 22 is constituted of a single plate-like member. In addition, as illustrated in FIGS. 1 and 4, the light guide plate 22 includes a light guide 23 having a light incidence surface (light entrance surface) 23a to which light from the LED 21 enters, and a low refractive layer 24 having a refractive index smaller than that of the light guide 23. The light guide 23 is made of a transparent material having a refractive index (n1), and the low refractive layer 24 is made of a transparent material having a refractive index (n2).

The refractive index (n1) of the light guide 23 is preferably 1.42 or larger and is more preferably 1.59 to 1.65. On the other hand, the refractive index (n2) of the low refractive layer 24 is preferably smaller than 1.42 and is more preferably 1.10 to 1.35. The refractive index (n1) of the light guide 23 and the refractive index (n2) of the low refractive layer 24 have a relationship of n2<n1. In this case, it is preferred that the refractive index (n1) of the light guide 23 and the refractive index (n2) of the low refractive layer 24 have a relationship of n1/n2>1.18.

The light guide 23 constituting the light guide plate 22 is made of a transparent resin material such as acrylic resin or polycarbonate. If the light guide 23 is made of acrylic resin or the like, the refractive index of the light guide 23 can be approximately 1.49. In addition, if the light guide 23 is made of polycarbonate or the like, the refractive index of the light guide 23 can be approximately 1.59. If the light guide 23 is made of acrylic resin, transparency can be improved more than a case where the light guide 23 is made of polycarbonate.

The light guide 23 is formed in a substantially rectangular parallelepiped shape. In other words, the light guide 23 is formed to have a light emitting surface 23b (upper surface) and a rear surface 23c (under surface) that are substantially parallel to each other. The light incidence surface (light entrance surface) 23a of the light guide 23 is disposed to be substantially parallel to a light emitting surface of the LED 21. Note that the light incidence surface 23a is a side surface of the light guide 23.

Figure 5:
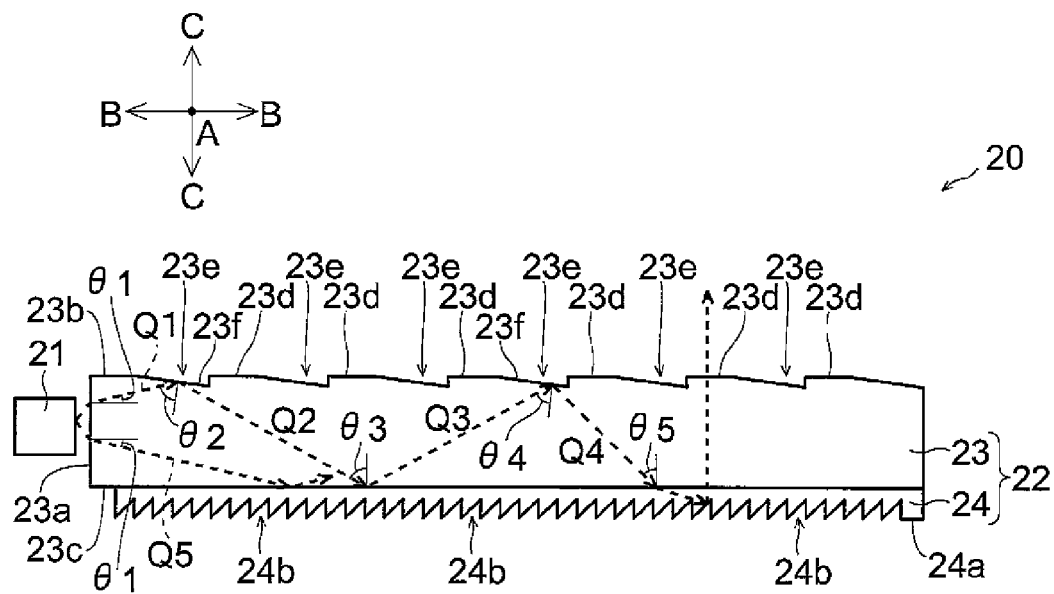
FIG. 5 is a cross-sectional view schematically illustrating the back-light unit according to the first embodiment of the present invention, and is also an optical path diagram illustrating a path of light.

As illustrated in FIG. 5, the low refractive layer 24 is formed integrally on the rear surface 23c of the light guide 23 without an air layer or the like between them. This low refractive layer 24 has a thickness of approximately 10 to 50 μm.

The low refractive layer 24 is made of a transparent resin material having a lower refractive index than the light guide 23 as described above. As such a resin material, there is fluoro acrylate or a resin containing hollow particles such as nanosize inorganic filler. If the low refractive layer 24 is made of fluoro acrylate or the like, the refractive index of the low refractive layer 24 can be approximately 1.35. In addition, if the low refractive layer 24 is made of a resin containing hollow particles such as nanosize inorganic filler, the refractive index of the low refractive layer 24 can be 1.30 or smaller.

In the first embodiment, on the light emitting surface 23b of the light guide 23, there are formed a plurality of prisms 23e for gradually decreasing incident angle of the light from the LED 21 to the rear surface 23c of the light guide 23. Specifically, on the light emitting surface 23b of the light guide 23, there are alternately formed a plurality of flat surface portions 23d and the plurality of concave prisms 23e along the normal direction to the light incidence surface 23a of the light guide 23 (in a B direction (perpendicular to the A direction)). In other words, the flat surface portion 23d is formed between the prisms 23e neighboring in the B direction (for example, in a length direction of the light guide plate 22). The flat surface portions 23d and the prisms 23e are formed to extend in the A direction (see FIG. 2). However, the flat surface portions 23d and the prisms 23e are divided by prisms 23i described later. Note that the prisms 23e are an example of the "first reflection portion" of the present invention.

Figure 6:
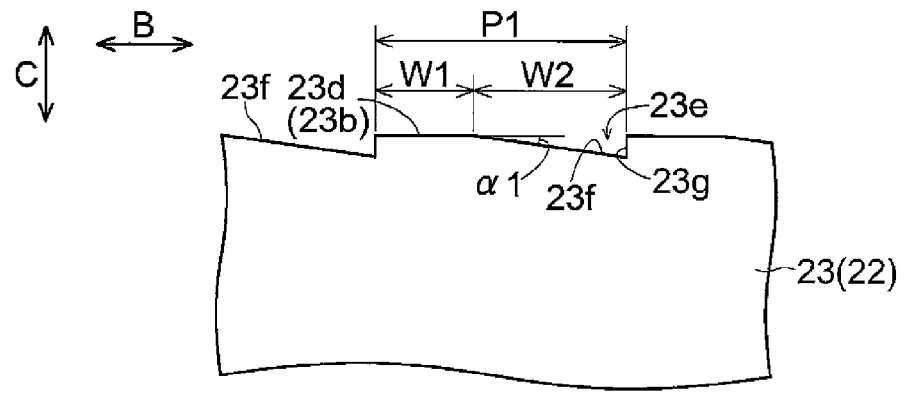
FIG. 6 is an enlarged cross-sectional view illustrating a structure of a light emitting surface of a light guide of the back-light unit according to the first embodiment of the present invention.

The flat surface portions 23d are formed in the same plane as the light emitting surface 23b and is formed in substantially parallel to the rear surface 23c. The flat surface portion 23d is formed to have a predetermined width W1 in the B direction as illustrated in FIG. 6.

The concave prism 23e includes an inclined surface 23f that is inclined to the flat surface portion 23d (light emitting surface 23b) and a vertical surface 23g that is substantially vertical to the flat surface portion 23d (light emitting surface 23b). This inclined surface 23f is formed to be closer to the rear surface 23c as being farther from the LED 21 as illustrated in FIG. 5. Thus, as described later, light emitted from the LED 21 is repeatedly reflected between the inclined surface 23f (prism 23e) and the rear surface 23c of the light guide 23, and hence the incident angle to the rear surface 23c of the light guide 23 is gradually decreased. Further, as illustrated in FIG. 6, an inclination angle α1 of the inclined surface 23f to the flat surface portion 23d is preferably 5 degrees or smaller and is more preferably 0.1 to 3.0 degrees.

The inclined surface 23f (prism 23e) is formed to have a predetermined width W2 in the B direction. The width W2 in the B direction of the inclined surface 23f (prism 23e) is preferably 0.25 mm or smaller, and is more preferably 0.01 to 0.10 mm. In addition, the inclined surfaces 23f (prisms 23e) are arranged at a predetermined pitch P1 (=W1+W2) in the B direction.

Note that the width W1 in the B direction of the flat surface portion 23d, the inclination angle α1 of the inclined surface 23f, the width W2 in the B direction of the inclined surface 23f (prism 23e), and the pitch P1 in the B direction of the inclined surfaces 23f (prisms 23e) may be constant regardless of a distance from the LED 21.

Figure 9:
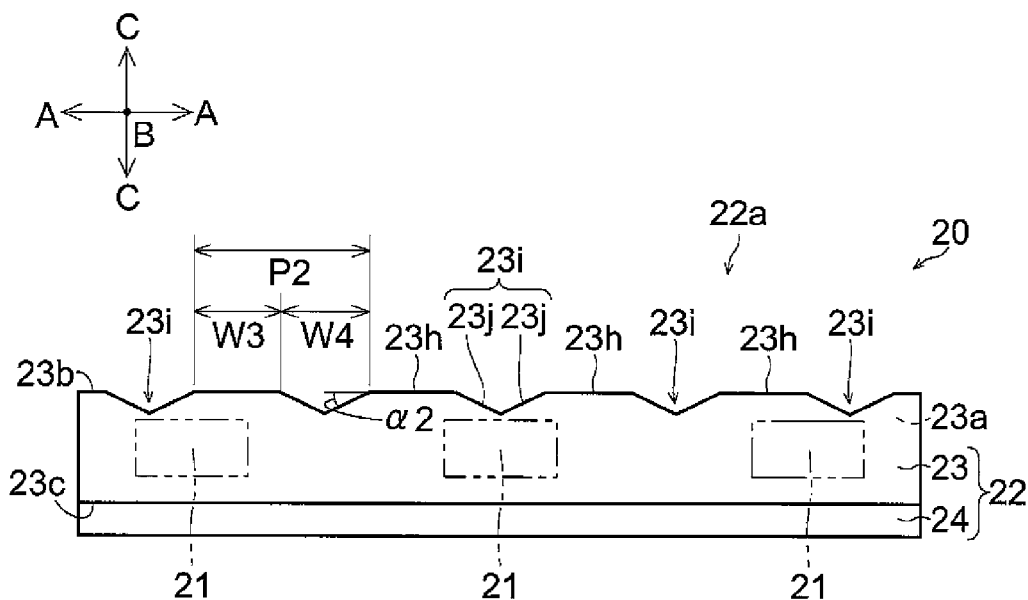
FIG. 9 is a cross-sectional view schematically illustrating the back-light unit according to the first embodiment of the present invention (a cross-sectional view of a light emitting region).
Figure 13:
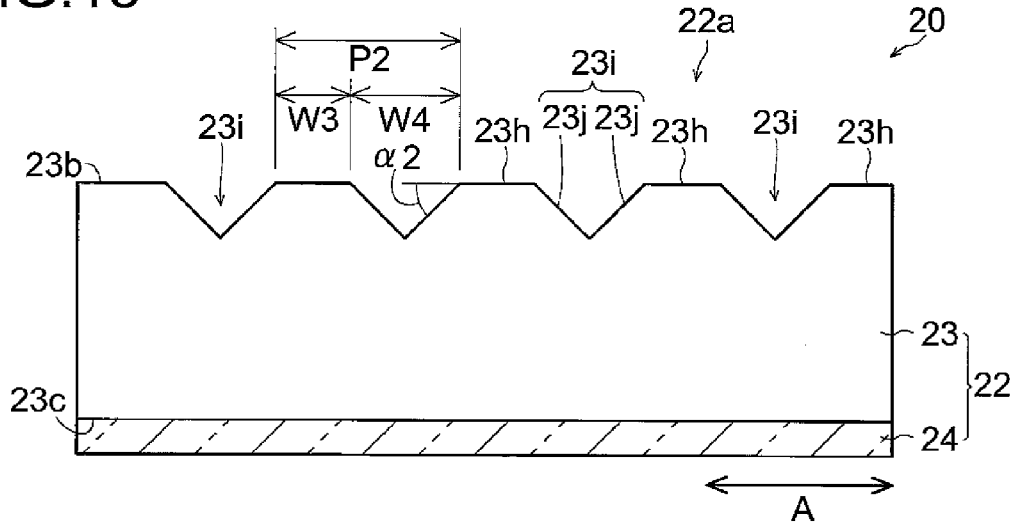
FIG. 13 is a diagram corresponding to a cross section taken along a2-a2 line in FIG. 3.

In addition, as illustrated in FIGS. 9 and 13, in the first embodiment, a plurality of flat surface portions 23h and a plurality of concave prisms 23i are alternately formed along the A direction on the light emitting surface 23b of the light guide 23. In other words, the flat surface portion 23h is formed between the prisms 23i neighboring in the A direction. The flat surface portions 23h and the prisms 23i are formed to extend in the normal direction (B direction) to the light incidence surface 23a of the light guide 23. Specifically, the flat surface portions 23h and the prisms 23i (inclined surfaces 23j) are formed to extend in the direction (B direction) substantially perpendicular to the light incidence surface 23a, viewed in a plan view.

The flat surface portions 23h are formed in the same surface as the light emitting surface 23b. In addition, the flat surface portion 23h is formed to have a predetermined width W3 in the A direction. The width W3 of the flat surface portion 23h is preferably 200 μm or smaller.

The concave prism 23i is constituted of a pair of inclined surfaces 23j that are inclined to the flat surface portion 23h (light emitting surface 23b). In other words, the concave prism 23i is formed to have a triangular cross section. An inclination angle α2 (to the flat surface portion 23h) of the pair of inclined surfaces 23j is preferably approximately 30 to 89 degrees. Note that the prisms 23i are an example of the "third reflection portion" of the present invention.

In addition, the pair of inclined surfaces 23j (prism 23i) is formed to have a predetermined width W4 in the A direction. The width W4 in the A direction of the pair of inclined surfaces 23j (prism 23i) is preferably approximately 0.1 mm or smaller, and is more preferably approximately 0.010 mm (10 μm) to 0.020 mm (20 μm).

It is preferred that a pitch P2 (=W3+W4) in the A direction of the prisms 23i should satisfy P2<W4×2 (W3/W4<1). In other words, it is preferred that the width W3 in the A direction of the flat surface portion 23h is smaller than the width W4 in the A direction of the pair of inclined surfaces 23j.

Further, it is preferred that the prisms 23i are formed to have the same shape and the same size at a constant pitch regardless of a position in the surface of the light guide 23. In other words, it is preferred that the width W3 in the A direction of the flat surface portion 23h, the inclination angle α2 of the pair of inclined surfaces 23j (to the flat surface portion 23h), the width W4 in the A direction of the pair of inclined surfaces 23j (prism 23i), and the pitch P2 of the pairs of inclined surfaces 23j (prisms 23i) in the A direction should be respectively constant.

In this way, in the first embodiment, the prisms 23i are formed to overlap with the prisms 23e in the same surface as the prisms 23e (the prisms 23e and the prisms 23i are formed in the light emitting surface 23b of the light guide 23). The prisms 23i have a function of dispersing light in a lateral direction (in the A direction that is intersecting the incident direction of the light). Note that an occupation area ratio of the prisms 23i to the prisms 23e is preferably 50% or higher.

On a rear surface 24a of the low refractive layer 24 (rear surface of the light guide plate 22), there are formed a plurality of concave prisms 24b as illustrated in FIG. 1. The prisms 24b are formed in the entire of at least the light emitting region 22a of the light guide plate 22. In addition, the prisms 24b are formed to extend in the A direction (see FIG. 4). In addition, the light emitting region 22a of the light guide plate 22 is disposed to correspond to a display area of the liquid crystal display panel 10. Note that the prisms 24b are an example of the "second reflection portion" of the present invention.

Figure 11:
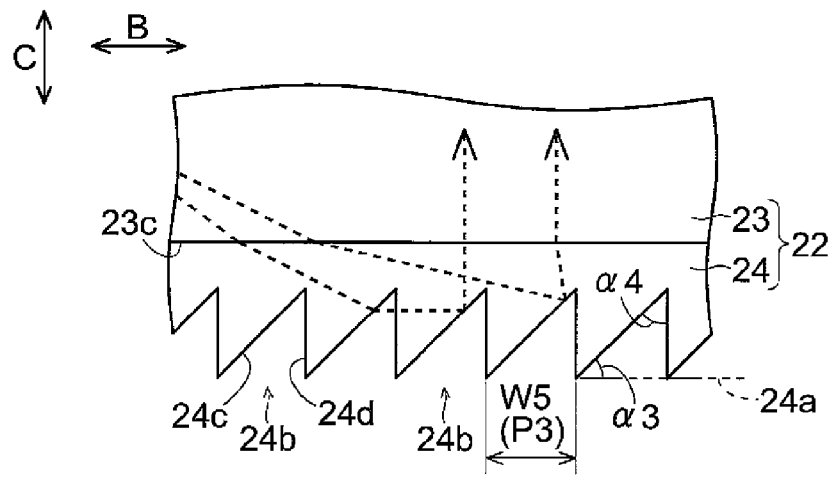
FIG. 11 is an enlarged cross-sectional view illustrating a structure of a rear side of a light guide plate of the back-light unit according to the first embodiment of the present invention, and is also an optical path diagram illustrating a path of light.

As illustrated in FIG. 11, the concave prism 24b is formed to have an inclined surface 24c that is inclined to the rear surface 24a and a vertical surface 24d that is perpendicular to the rear surface 24a.

In addition, in the first embodiment, the inclined surface 24c is formed to be not a curved surface but a flat surface. The inclined surface 24c is formed to be closer to the light guide 23 as being farther from the LED 21 (see FIG. 1). In this case, an inclination angle α3 of the inclined surface 24c to the rear surface 24a is preferably approximately 40 to 50 degrees. In other words, it is preferred that an angle α4 between the inclined surface 24c and the vertical surface 24d should be approximately 50 to 40 degrees.

In addition, the inclined surface 24c (prism 24b) is formed to have a predetermined width W5 in the B direction. The width W5 in the B direction of the inclined surface 24c (prism 24b) is approximately 0.1 mm or smaller and is preferably approximately 0.010 to 0.025 mm.

Further, the inclined surfaces 24c (prisms 24b) are arranged at a pitch P3 that is the same as the width W5 in the B direction. In other words, the plurality of prisms 24b are formed continuously without gaps in the B direction, and there is no flat surface portion between the prism 24b and the prism 24b.

Note that the prisms 24b may be formed to have the same shape and the same size at a constant pitch in substantially the entire rear surface 24a of the low refractive layer 24 regardless of a position in the surface of the low refractive layer 24. Because the prisms 24b are formed to have the same shape and the same size at a constant pitch, it is possible to suppress difference of the light condensing characteristics in the surface of the low refractive layer 24. Thus, it is possible to achieve uniform luminance of the liquid crystal display panel 10 (see FIG. 1).

As described later, the prisms 24b have a function of totally reflecting light from the LED 21 frontward (to the upper surface side) at the boundary between the light guide plate 22 and the air layer.

Figure 10:
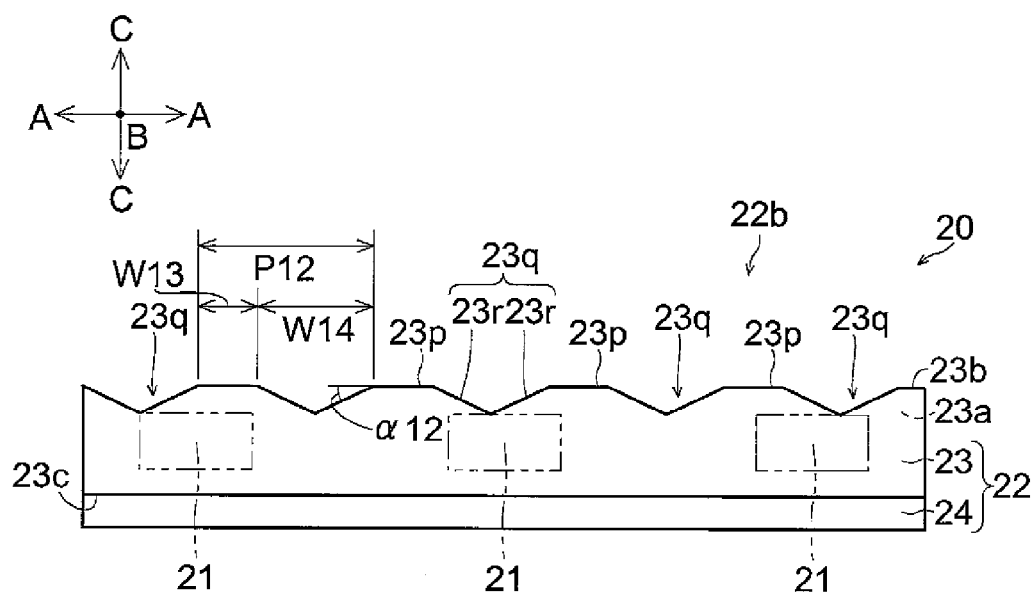
FIG. 10 is a cross-sectional view schematically illustrating the back-light unit according to the first embodiment of the present invention (a cross-sectional view of an end region).
Figure 12:
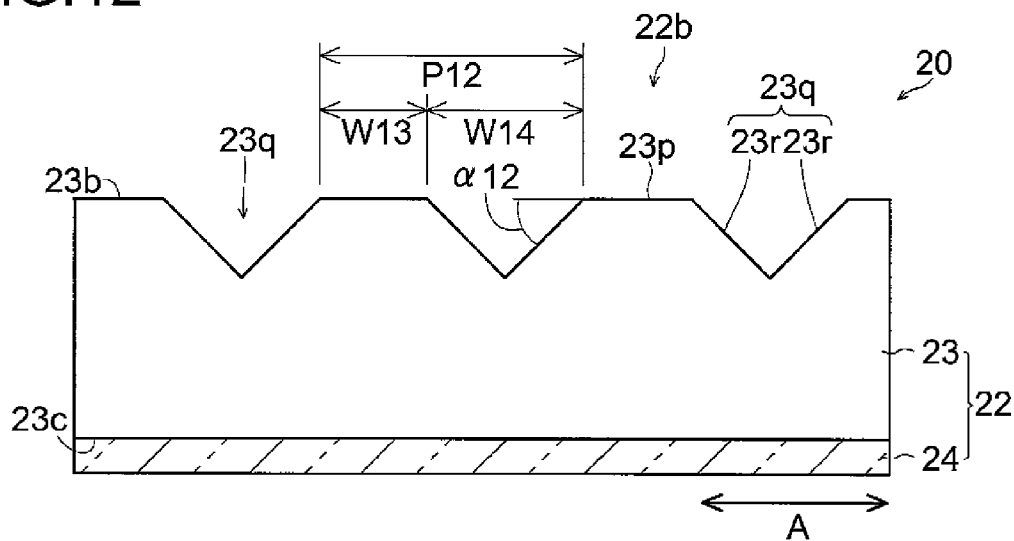
FIG. 12 is a diagram corresponding to a cross section taken along a1-a1 line in FIG. 3.

In addition, in the first embodiment, as illustrated in FIGS. 3 and 4, a plurality of concave prisms 23q are formed along the A direction in an end portion of the light guide plate 22 on the LED 21 side (in an end region 22b (in a vicinity of a light incident portion)). The prism 23q is formed to have a triangular cross section as illustrated in FIGS. 10 and 12. In addition, the prism 23q has a pair of inclined surfaces 23r. Note that the prisms 23q are an example of the "fourth reflection portion" of the present invention.

Figure 14:
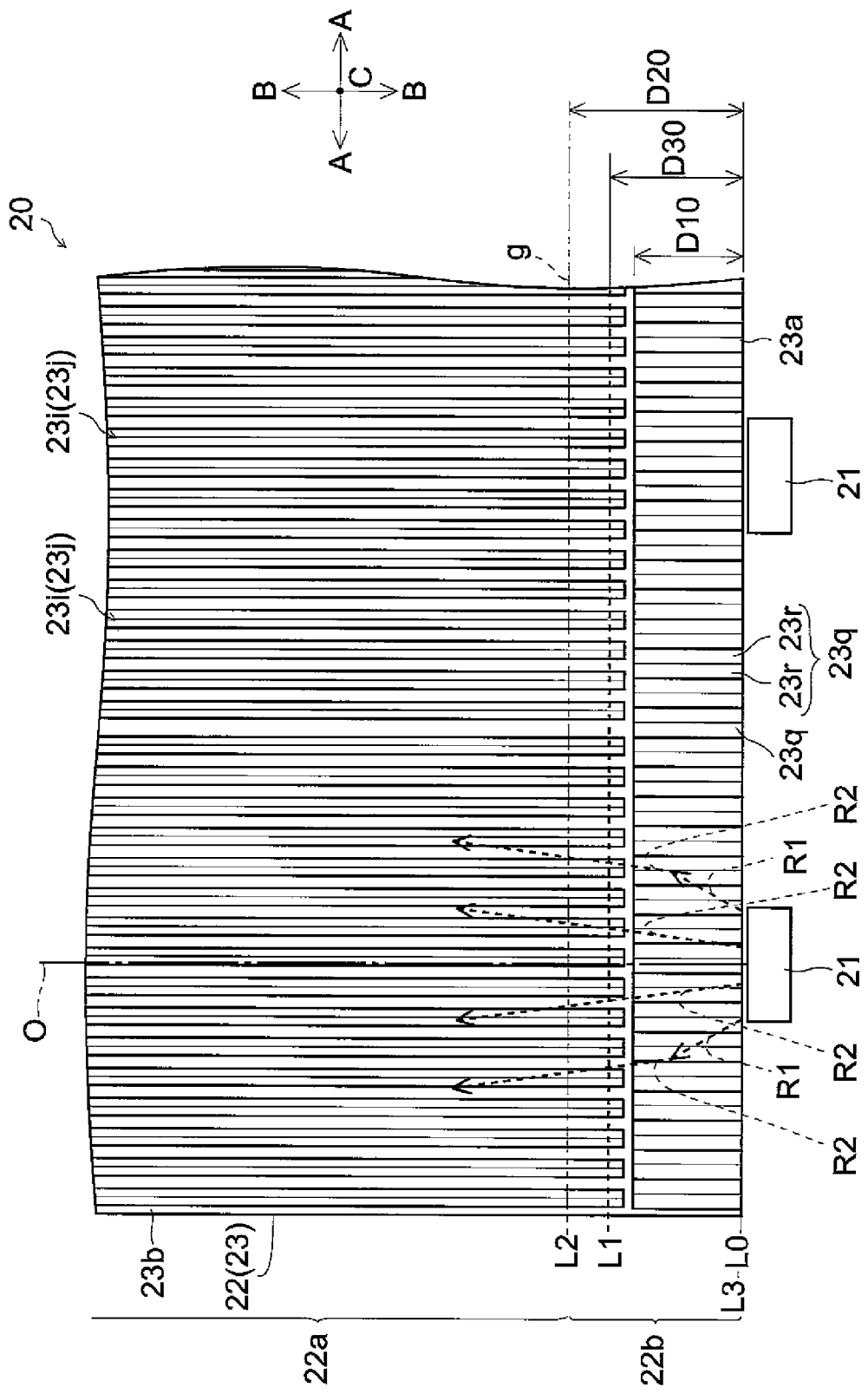
FIG. 14 is a plan view schematically illustrating a part of the back-light unit according to the first embodiment of the present invention.

A more detailed description is as follows. As illustrated in FIGS. 1 and 3, the light guide plate 22 (light guide 23) of the first embodiment includes the region 22a corresponding to the display area of the liquid crystal display panel 10 (see FIG. 1) (light emitting region 22a for emitting planar light frontward toward the liquid crystal display panel 10) and the end region 22b of the light guide plate 22 on the LED 21 side (the region close to the light incident portion) viewed in a plan view. The end region 22b is adjacent to the light emitting region 22a. Further, as illustrated in FIG. 14, a region from the light incidence surface 23a to a distance D20 in the B direction is the end region 22b. In other words, a boundary between the end region 22b and the light emitting region 22a (imaginary line g) is set at the position apart from the light incidence surface 23a by the distance D20 in the B direction. The distance D20 is different depending on design of the liquid crystal display panel and an interval between the light sources, and can be set to satisfy 0.5≤D20/P≤2, for example, where P denotes the interval between the light sources. Note that the light emitting region 22a is a region on the side opposite to the LED 21 with respect to the end region 22b. Further, the plurality of concave prisms 23q are formed in the end region 22b (in a vicinity of the light incident portion) on the upper surface of the light guide plate 22 (light guide 23).

The concave prisms 23q are formed to extend in the normal direction to the light incidence surface 23a (B direction) similarly to the prism 23i as illustrated in FIG. 3. Specifically, the prisms 23q (inclined surfaces 23r) are formed to extend from the light incidence surface 23a in substantially the perpendicular direction (B direction) viewed in a plan view. In addition, as illustrated in FIG. 14, a length D10 of the prism 23q in the B direction is preferably 0.5 mm or larger and is more preferably 1 mm or larger.

In the first embodiment, the length D10 of the prism 23q is set to be smaller than the distance D20 of the end region 22b. In other words, a relationship of D10<D20 is satisfied.

In addition, as illustrated in FIGS. 10 and 12, the pair of inclined surfaces 23r (prism 23q) is formed to have a predetermined width W14 in the A direction. The width W14 in the A direction of the pair of inclined surfaces 23r (prism 23q) is preferably approximately 0.010 mm (10 µm) to 0.020 mm (20 µm). In addition, an inclination angle α12 of the inclined surface 23r is preferably approximately 30 to 89 degrees.

Note that a flat surface portion 23p (without the prisms 23q) may be formed between prisms 23q neighboring in the A direction. In this case, the flat surface portion 23p is formed to have a predetermined width W13 in the A direction. The width W13 of the flat surface portion 23p is preferably 200 µm or smaller. In addition, it is possible to adopt a structure in which the flat surface portion 23p is not formed in the end region 22b of the light guide plate 22 on the LED 21 side (in a vicinity of the light incident portion). Therefore, the width W13 of the flat surface portion 23p is preferably 0 to 200 µm.

In addition, it is preferred that a pitch P12 (=W13+W14) in the A direction of the prisms 23q satisfies P12<W14×2 (W13/W14<1). In other words, it is preferred that the width W13 of the flat surface portion 23p in the A direction is smaller than the width W14 of the pair of inclined surfaces 23r in the A direction.

As illustrated in FIGS. 3 and 4, the prisms 23e and the prisms 23i are formed mainly in the light emitting region 22a of the light guide 23.

Here, in the first embodiment, a beginning position L1 of the prisms 23e is not positioned in the light emitting region 22a but is positioned in the end region 22b (including a boundary between the light emitting region 22a and the end region 22b). In detail, the prisms 23e begin from the position L1 (a predetermined position inside the end region 22b) separated from the light incidence surface 23a by a predetermined distance D30 in the B direction. In other words, the prisms 23e begin from a position closer to the light incidence surface 23a than the light emitting region 22a (display area). The distance D30 is different depending on design of the liquid crystal display panel and an interval between the light sources, and can be set to satisfy 0.5≤D30/P≤2, for example, where P denotes the interval between the light sources. However, as described later, a relationship between the distance D30 and the distance D20 satisfies D30≤D20. Also as to the prisms 23i, similarly to the prisms 23e, a beginning position thereof is not positioned in the light emitting region 22a but is positioned in the end region 22b (including the boundary between the light emitting region 22a and the end region 22b). The beginning position of the prisms 23e may be the same as that of the prisms 23i or may be different from the same. Further, the prisms 23q are formed in a region in the end region 22b where the prisms 23e are not formed (a region in the end region 22b on the LED 21 side in which the prisms 23e and the prisms 23i are not formed). In other words, the region in the end region 22b closer to the LED 21 than the prisms 23e has a structure different from that of the light emitting region 22a.

Figure 7:
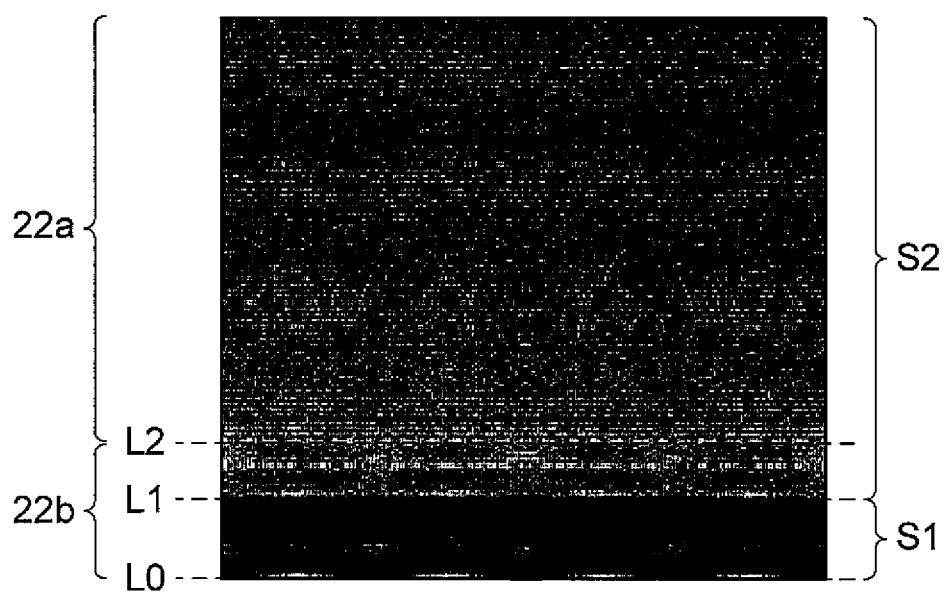
FIG. 7 is a diagram schematically illustrating a part of the back-light unit according to the first embodiment of the present invention (a diagram illustrating a boundary between presence and absence of prisms).

Because the prisms 23e have a function of extracting light as described later, the region with the prisms 23e has higher luminance than the region without the prisms 23e. Therefore, as illustrated in FIG. 7, a region S1 without the prisms 23e and a region S2 with the prisms 23e have different luminance values so that a boundary between them is easily visually recognized. In other words, the beginning position L1 of the prisms 23e becomes the boundary between the different luminance values, and the boundary is easily visually recognized.

Therefore, in the first embodiment, the prisms 23e and 23i are configured to begin from the end region 22b as described above. Thus, the boundary between the region S1 without the prisms 23e and the region S2 with the prisms 23e is in the end region 22b, and hence the boundary is not positioned in the light emitting region (display area). Therefore, the boundary is not visually recognized, and it is possible to emit light uniformly from the light emitting region 22a.

Further, with reference to a position L0 of the light incidence surface 23a (end of the light guide 23 on the LED side), the position L0, the beginning position L1 of the prisms 23e, and a beginning position L2 of the light emitting region 22a (display area) satisfy a relationship of L0<L1≤L2. However, it is supposed that the positions become larger as being farther from the position L0 in the B direction. In addition, when the position L1 becomes close to the position L0, emitting light intensity in the non-display area increases, and hence light loss increases. Therefore, it is preferred that the position L1 should be close to the position L2.

The above-mentioned length D10 of the prism 23q is shorter than the distance D30 from the light incidence surface 23a to the beginning position L1 of the prisms 23e. In addition, the distance D30 is shorter than the distance D20 from the light incidence surface 23a to the light emitting region 22a (beginning position L2 of the light emitting region 22a (display area)). Therefore, the relationship among D10, D20 and D30 satisfies D10<D30≤D20. Further, when the end position of the prism 23q is denoted by L3, the positional relationship among the prisms satisfies L0<L3<L1≤L2.

Figure 8:
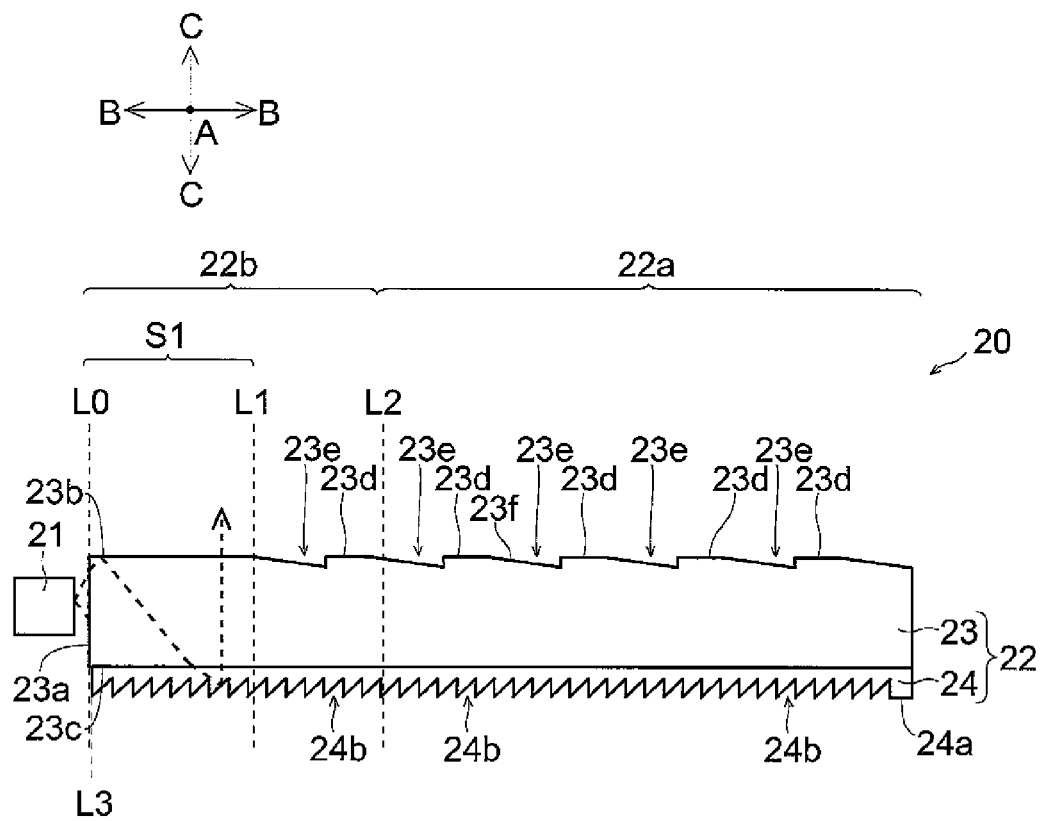
FIG. 8 is a cross-sectional view schematically illustrating the back-light unit according to the first embodiment of the present invention, and is also an optical path diagram illustrating a path of light.

In addition, in the first embodiment, the prisms 24b are formed from a position closer to the light incidence surface 23a (LED 21) than the prisms 23e as illustrated in FIG. 8. In other words, the beginning position L3 of the prisms 24b is positioned closer to the LED 21 than the beginning position L1 of the prisms 23e. Note that the prisms 24b preferably begin from the light incidence surface 23a (position L0). In other words, the prisms 24b are preferably formed on the entire rear surface 24a of the low refractive layer 24 (rear surface of the light guide plate 22).

Here, as described above, if the light guide plate 22 is configured to have the light guide 23 and the low refractive layer 24, and to have the prisms 23e, the prisms 23i, the prisms 24b and the like, a bright line having a V shape (V-shaped bright line) is apt to occur in a vicinity of the light incidence surface 23a of the light guide plate 22 (vicinity of the light incident portion) as described later. Such occurrence of the V-shaped bright line may deteriorate illumination quality in a vicinity of the light incidence surface 23a.

The V-shaped bright line is caused by light expanding in the lateral direction in the light guide plate 22 as described later. Therefore, in order to suppress the V-shaped bright line, it is effective to condense the light expanding in the lateral direction to a front direction. On the other hand, the linear unevenness is a phenomenon caused by directivity of the light emitted from the LED 21 when light rays are concentrated most in the front direction. Therefore, if the light is condensed too much in the front direction, the linear unevenness is emphasized. In this way, the V-shaped bright line and the linear unevenness have a trade-off relationship. Therefore, it is not easy to solve both of them simultaneously.

Therefore, in the first embodiment, as described above, the prisms 23q are formed in the end region 22b of the light guide 23 (light guide plate 22) on the LED 21 side, and the prisms 23q are configured to change the propagation angle of the light expanding in the lateral direction (A direction) more largely than the prisms 23i in the light emitting region 22a. In order to realize this structure, in the first embodiment, the prism 23q has a shape (including a size and the like) different from that of the prism 23i. In other words, in the first embodiment, prisms are formed on the upper surface of the light guide plate 22 to have different shape between the end region 22b and the light emitting region 22a.

The prisms 23q (inclined surfaces 23r) in the end region 22b are configured to reflect light R1 emitted in a direction of the V-shaped bright line so as to change the light angle distribution in the horizontal direction (lateral direction). In other words, the prisms 23q (inclined surfaces 23r) are configured to effectively change the angle of the V-shaped bright line component light (arrow R1 in FIGS. 3 and 14) so as to increase light components that do not become the V-shaped bright line component (arrow R2 in FIGS. 3 and 14). For instance, the prisms 23q in the end region 22b reflect the light R1 entering from the LED 21 to the light guide plate 22 so as to be close to an optical axis O (in a direction of decreasing angle with the optical axis O).

On the other hand, the prisms 23i formed in the light emitting region 22a have smaller effect of changing the propagation angle of the light expanding in the lateral direction than the prisms 23q in the end region 22b. In other words, the prisms 23i expand (disperse) the light in the direction intersecting the incident direction of the light more than the prisms 23q. Therefore, in the light emitting region 22a, the light is dispersed appropriately by the prisms 23i so that occurrence of the linear unevenness is suppressed.

Further, in order to suppress occurrence of the linear unevenness by the prisms 23i in the light emitting region 22a, it is preferred that the prisms 23i should satisfy one of the following conditions (a) and (b).

(a) The inclination angle $\alpha 2$ of the inclined surface 23j of the prism 23i is smaller than the inclination angle $\alpha 12$ of the inclined surface 23r of the prism 23q ($\alpha 2 < \alpha 12$).

(b) An occupancy ratio of the inclined surface 23j (inclined region) of the prism 23i is smaller than an occupancy ratio of the inclined surface 23r (inclined region) of the prism 23q (occupancy ratio of the flat surface portion is larger than that of the prism 23q) (W3/W4>W13/W14).

Next, with reference to FIGS. 3, 5, 9, 11, and 14 to 16, there is described an optical path for the light emitted from the LED 21 of the back-light unit 20 according to the first embodiment.

The light emitted from the LED 21 has the largest intensity in the front direction of the LED 21 (B direction) and has expansion angles of ±90 degrees in the A direction and in a C direction with respect to the front direction. The light emitted from the LED 21 is refracted when entering the light incidence surface 23a of the light guide 23 (light guide plate 22) as illustrated in FIG. 5 to have expansion angles of ±θ1 in the A direction and in the C direction with respect to the front direction. Note that the angle θ1 is a critical angle between the light guide 23 and the air layer, and $\theta 1 = \arcsin(1/n1)$ holds.

Among the light entering the light incidence surface 23a of the light guide 23, light Q1 propagating toward the light emitting surface 23b of the light guide 23 propagates toward the inclined surface 23f of the prism 23e with an incident angle of θ2 (=90°−θ1−α1) or larger, and most of the light is totally reflected toward the rear surface 23c by the prisms 23e of the light guide 23 (interface between the light emitting surface 23b of the light guide 23 and the air layer).

Further, light Q2 totally reflected by the prism 23e propagates toward the rear surface 23c (low refractive layer 24) with an incident angle of θ3 (=90°−θ1−α1×2) or larger. In this case, among the light Q2 propagating toward the rear surface 23c, only light having an incident angle smaller than the critical angle between the light guide 23 and the low refractive layer 24 enters the low refractive layer 24. On the other hand, among the light Q2 propagating toward the rear surface 23c, the light having an incident angle larger than or equal to the critical angle between the light guide 23 and the low refractive layer 24 is totally reflected toward the light emitting surface 23b by the rear surface 23c of the light guide 23 (interface between the light guide 23 and the low refractive layer 24).

In addition, the light Q3 totally reflected by the rear surface 23c propagates toward the inclined surface 23f of the prism 23e with an incident angle of θ4 (=90°−θ1−α1×3) or larger and is totally reflected by the prisms 23e of the light guide 23 toward the rear surface 23c.

Further, light Q4 totally reflected by the prism 23e propagates toward the rear surface 23c (low refractive layer 24) with an incident angle of θ5 (=90°−θ1−α1×4) or larger. In this case, among the light Q4 propagating toward the rear surface 23c, only light having an incident angle smaller than the critical angle between the light guide 23 and the low refractive layer 24 enters the low refractive layer 24. On the other hand, among the light Q4 propagating toward the rear surface 23c, light having an incident angle larger than or equal to the critical angle between the light guide 23 and the low refractive layer 24 is totally reflected by the rear surface 23c of the light guide 23 toward the light emitting surface 23b.

In this way, the light emitted from the LED 21 is repeatedly reflected between the prisms 23e of the light guide 23 (light emitting surface 23b) and the rear surface 23c, and is guided so that the incident angle to the rear surface 23c of the light guide 23 is gradually decreased, so as to enter the low refractive layer 24.

Further, when the light emitted from the LED 21 is repeatedly reflected between the prisms 23e of the light guide 23 and the rear surface 23c, the incident angle to the rear surface 23c of the light guide 23 is decreased step by step by approximately $\alpha 1 \times 2$. Therefore, the expansion angle of the light entering the low refractive layer 24 in the B direction is approximately $\alpha 1 \times 2$ or smaller.

In addition, among the light entering the light incidence surface 23a of the light guide 23, light Q5 propagating toward the rear surface 23c of the light guide 23 is also repeatedly reflected between the rear surface 23c of the light guide 23 and the prism 23e (light emitting surface 23b) in the same manner, so as to enter the low refractive layer 24.

After that, as illustrated in FIG. 11, substantially all of the light entering the low refractive layer 24 is totally reflected (see a broken line arrow) by the inclined surface 24c of the prism 24b (interface between the inclined surface 24c of the prism 24b and the air layer) to the front (toward the liquid crystal display panel 10), or passes through and then is totally reflected (see the broken line arrow). Further, the totally reflected light (see the broken line arrow) enters the light guide 23 again and emits from the light emitting surface 23b (see FIG. 5) to the front (toward the liquid crystal display panel 10).

Further, the refractive index (n1) of the light guide 23 is 1.42 or larger (for example, approximately 1.59 to 1.65), and the refractive index of the air layer is approximately 1. Therefore, the critical angle between the light guide 23 and the air layer is smaller than the critical angle between the light guide 23 and the low refractive layer 24. For this reason, there is almost no light that emits from the light emitting surface 23b without via the prism 24b of the low refractive layer 24.

In addition, in the first embodiment, as illustrated in FIG. 9, because the prisms 23i are formed on the front surface 23b of the light guide 23, a part of the light propagating toward the front surface 23b of the light guide 23 is dispersed (reflected) by the inclined surfaces 23j of the prism 23i to both sides in the A direction.

In this case, viewed from the light incidence surface 23a side of the light guide 23, light having a large incident angle to the front surface (upper surface) 23b of the light guide 23 is reflected by the inclined surfaces 23*j* of the prism 23*i* so that the incident angle to the rear surface 23*c* of the light guide 23 is decreased.

Further, the light from the LED 21 is dispersed in the A direction and enters the low refractive layer 24 as described above.

On the other hand, as illustrated in FIGS. 3 and 14, among the light from the LED 21 entering the light incidence surface 23*a*, the light R1 emitted in the V-shaped bright line direction is reflected by the prisms 23*q* (inclined surfaces 23*r*) in the end region 22*b*, and a light guide angle (propagation angle) thereof is changed. Specifically, the light entering the light incidence surface 23*a* is reflected by the prism 23*q* (inclined surface 23*r*) in the direction approaching the optical axis O (in which an angle with the optical axis O is decreased). For this reason, the light R1 having an angle distribution to be the V-shaped bright line (light to be a component of the V-shaped bright line) is changed to the light R2 having an angle distribution not to be the V-shaped bright line (light not to be a component of the V-shaped bright line). Thus, the light entering the light incidence surface 23*a* becomes light not to be a component of the V-shaped bright line and propagates in the light guide plate 22. Therefore, occurrence of the V-shaped bright line is suppressed.

In the end region 22*b* of the light guide plate 22 (light guide 23), as illustrated in FIG. 15, the prisms 23*q* suppress expansion of light in the lateral direction (for example, A direction) (see the broken line arrow in FIG. 15). On the other hand, as illustrated in FIG. 16, in the light emitting region 22*a*, there are formed the prisms 23*i* having a smaller effect of suppressing the expansion of light than the prisms 23*q*. Therefore, the light is appropriately dispersed in the light emitting region 22*a* (see a broken line arrow in FIG. 16). Thus, occurrence of linear unevenness is suppressed.

In addition, as illustrated in FIG. 8, the light entering the light incidence surface 23*a* of the light guide 23 contains a light component (that is referred to as a component A) that promptly enters the low refractive layer 24 after entering the light guide 23 without being totally reflected by the low refractive layer 24 (see a broken line arrow). This component A is emitted from the prism 24*b* and hence causes unevenness of luminance because it is emitted at the same time at the position where the prisms 24*b* exist (at the beginning position of the prisms 24*b*). (Further, in accordance with Snell's law, light amount of the component A becomes larger as a difference between the refractive index (n1) of the light guide 23 and the refractive index (n2) of the low refractive layer 24 becomes smaller.) Therefore, for instance, if the prisms 24*b* begin from a position closer to the light emitting region 22*a* than the prisms 23*e*, light that may cause unevenness of luminance is emitted from the light emitting region 22*a*.

In the first embodiment, as described above, the prisms 24*b* begin from a position closer to the light incidence surface 23*a* (LED 21) than the prisms 23*e*. In other words, the prisms 24*b* begin from a position closer to the front side (LED 21 side) than the light emitting region 22*a*. Therefore, the component A that may cause unevenness of luminance can be emitted from the end region 22*b* closer to the front than the light emitting region 22*a* (beginning position L2 of the display area). Thus, emission of the light that may cause unevenness of luminance from the light emitting region 22*a* is suppressed.

Next, with reference to FIGS. 24 to 29, a reason why expansion of the light emitting from the light guide plate 22 in the A direction is suppressed is described in detail.

Figure 24:
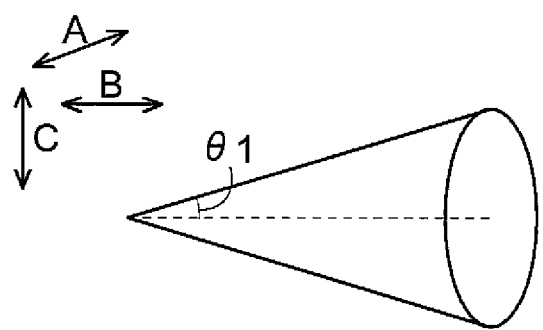
FIG. 24 is a perspective view for explaining expansion of light entering the light guide of the back-light unit according to the first embodiment of the present invention.

The light emitted from the LED 21 has expansion angles of ±90 degrees in the A direction and in the C direction with respect to the front direction (B direction) of the LED 21. This light emitted from the LED 21 is refracted when entering the light incidence surface 23*a* of the light guide 23, and the expansion angles in the A direction and in the C direction with respect to the B direction become ±θ1 as illustrated in FIG. 24. Note that the angle θ1 is the critical angle between the light guide 23 and the air layer.

Here, supposing that the light exists in a range of the angle θ in the A direction and in the C direction with respect to the B direction in the light guide 23, the following expression (1) holds.

$$0 \leq \theta 1 = \arcsin(1/n1) \quad (1)$$

When the critical angle between the light guide 23 and the low refractive layer 24 is denoted by φ, only light in a region satisfying the following expression (2) can enter the low refractive layer 24.

$$\pi/2 - \theta < \phi = \arcsin(n2/n1) \quad (2)$$

Figure 25:
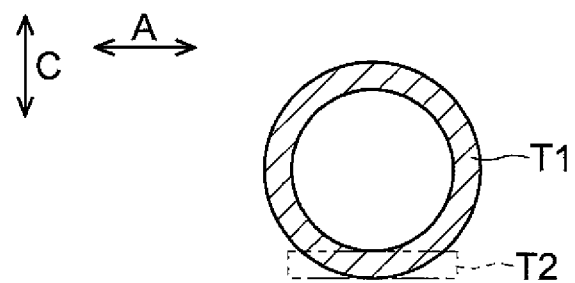
FIG. 25 is a diagram of light entering the light guide of the back-light unit according to the first embodiment of the present invention, viewed from the LED side.

In addition, this region is illustrated as a region T1 (hatching region) in FIG. 25. Further, as described later, among the light just after entering the light guide 23, only light in a region T2 illustrated in FIG. 25 can actually enter the low refractive layer 24. The reason of this is as described below.

The expansion component of the light entering the light guide 23 in the C direction is denoted by $\theta_C$, and then the incident angle of the light to the low refractive layer 24 is $\pi/2 - \theta_C$. In addition, the condition for the light to enter the low refractive layer 24 is $\pi/2 - \theta_C < \phi$, and the following expression (3) is derived because $0 < \pi/2 - \theta_C < 90$ is satisfied.

$$\cos(\pi/2 - \theta_C) = \sin \theta_C > \cos \phi \quad (3)$$

Figure 26:
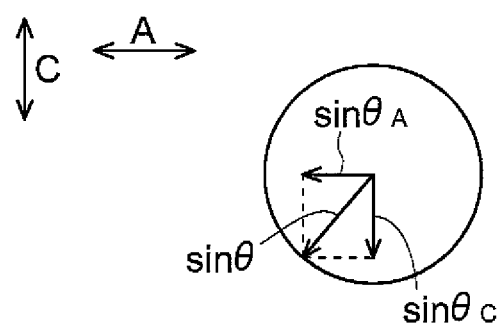
FIG. 26 is a diagram of light entering a low refractive layer among light entering the light guide of the back-light unit according to the first embodiment of the present invention, viewed from the LED side.

In addition, the expansion component of the light entering the light guide 23 in the A direction is denoted by $\theta_A$, and then $\theta_A$ satisfies the following expression (4) as understood from FIG. 26.

$$\sin^2 \theta_A = \sin^2 \theta - \sin^2 \theta_C \quad (4)$$

Here, from the expressions (1) and (3), $\sin \theta \leq \sin \theta 1$ and $\cos \phi < \sin \theta_C \leq \sin \theta 1$ are derived. Therefore, using the expression (4), the following expression (5) is derived.

$$0 \leq \sin^2 \theta_A < \sin^2 \theta 1 - \cos^2 \phi \quad (5)$$

For instance, if n1=1.59 and n2=1.35, a possible range of $\theta_A$ is expressed by $0 \leq \theta_A < 19.95$, and hence the expansion of light in the A direction can be suppressed. Note that the effect of suppressing the expansion of light in the A direction is decreased a little by the prisms 23*i*. However, because the width W3 in the A direction of the flat surface portion 23*h* is smaller than or equal to the width W4 in the A direction of the prism 23*i*, most part of the effect of suppressing the expansion of light in the A direction can be maintained by increasing the inclination angle of the prism 23*i* (by decreasing the vertex angle).

Figure 27:
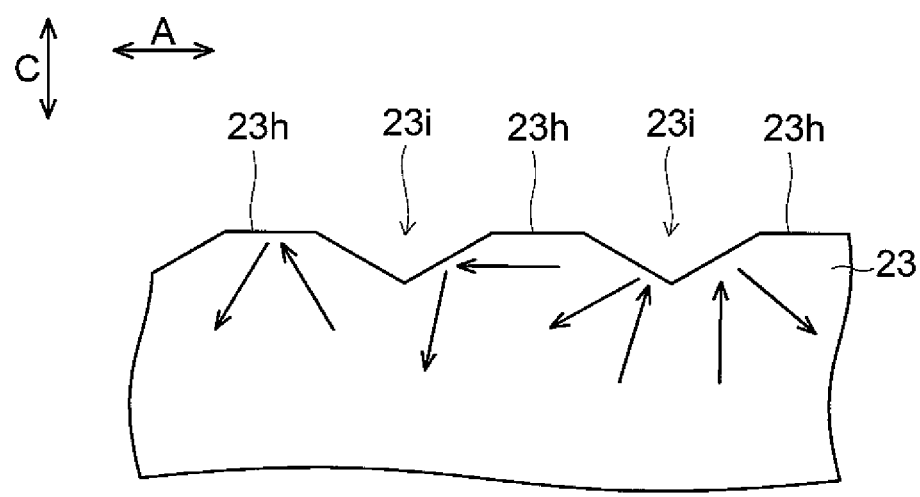
FIG. 27 is a diagram illustrating light reflected by flat surface portions 23h and prisms 23i of the light guide of the back-light unit according to the first embodiment of the present invention.
Figure 28:
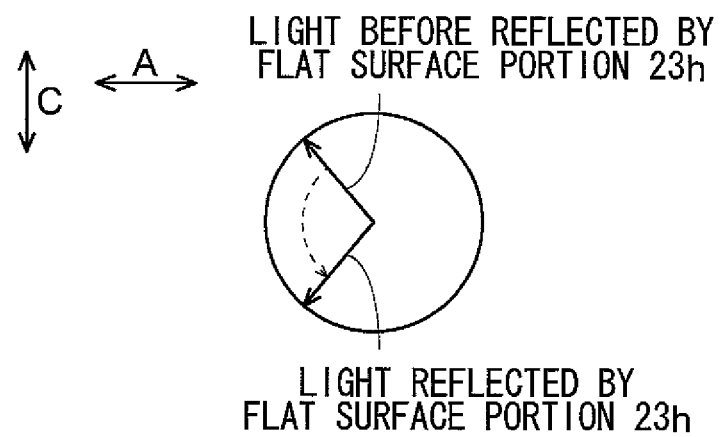
FIG. 28 is a diagram illustrating light reflected by the flat surface portion 23h of the light guide of the back-light unit according to the first embodiment of the present invention.
Figure 29:
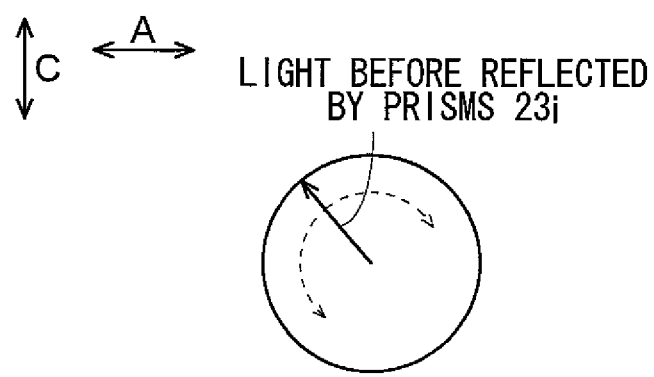
FIG. 29 is a diagram illustrating light reflected by the prism 23i of the light guide of the back-light unit according to the first embodiment of the present invention.

Influences of the flat surface portions 23*h* and the prisms 23*i* are further described. The light reflected by the flat surface portion 23*h* of the light guide 23 is inverted in the C direction while maintaining the expansions in the B direction and in the A direction as illustrated in FIGS. 27 and 28. On the other hand, the light reflected by the prism 23*i* of the light guide 23 is changed in the expansion components in the C direction and in the A direction while maintaining the expansion in the B direction as illustrated in FIGS. 27 and 29.

Therefore, it is possible to suppress biases of expansions of the light in the C direction and in the A direction in the light guide 23. In other words, because the expansions of the lights in the C direction and in the A direction are changed in the light guide 23 at any time by the prisms 23i, the component in the C direction can be equivalent to the component in the A direction.

Thus, the light in the region T1 (see FIG. 25) satisfying the expression (2) enters the low refractive layer 24 when the expansion components in the C direction and in the A direction are changed by the prisms 23i so as to satisfy the expression (3). As a result, the light whose expansion in the A direction is suppressed can be emitted uniformly from the light guide plate 22.

Next, with reference to FIGS. 3 to 10 and 17 to 23, the V-shaped bright line that occurs in the light guide plate 22 in a vicinity of the light incidence surface is described.

Figure 17:
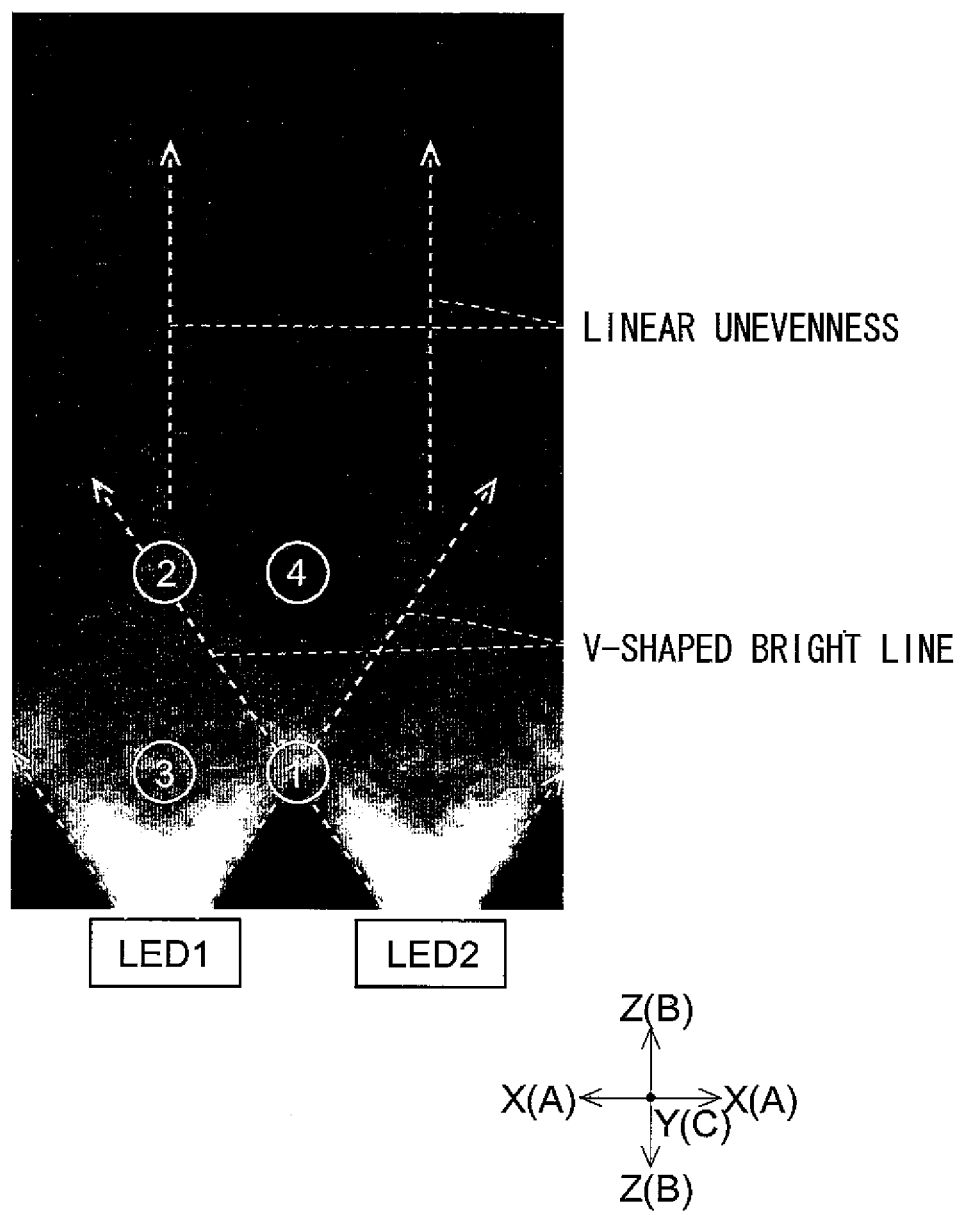
FIG. 17 is a diagram illustrating a V-shaped bright line and linear unevenness.

As described above, when the light guide plate 22 (see FIG. 4) is configured to include the light guide 23, the low refractive layer 24, the prisms 23e, the prisms 23i, the prisms 24b, and the like, the V-shaped bright line is apt to occur in the light guide plate 22 in a vicinity of the light incidence surface as illustrated in FIG. 17. Therefore, the inventors of the present invention have studied about causes of this V-shaped bright line.

First, it is determined by simulation which angle of light affects the V-shaped bright line in the entire angle distribution of the light emitted from the LED (light source). The result is shown in FIG. 18. FIG. 18 is a diagram showing the light angle distribution in each region in FIG. 17. Region "1" is positioned at a V-shaped bright line portion of each of the LED1 and the LED 2, and Region "2" is positioned at a V-shaped bright line portion of the LED 2. On the other hand, Region "3" and Region "4" are positioned in regions apart from the V-shaped bright line. In addition, sections (a) to (d) in FIG. 18 show light angle distributions from the LED1, and sections (e) to (h) in FIG. 18 show light angle distributions from the LED 2.

As shown in FIG. 18, in the Region "1" positioned in the V-shaped bright line portion, light intensity of an angle of a lateral portion (enclosed by a broken line) was high in each of the LED1 ((a) in FIG. 18) and the LED 2 ((e) in FIG. 18), and this light was observed as the V-shaped bright line. In addition, because the Region "2" is positioned in the V-shaped bright line portion of the LED 2, light intensity at the angle of the lateral portion (enclosed by a broken line) was observed to be high in the LED 2 ((f) in FIG. 18). On the other hand, in the Region "3" and the Region "4" that are not positioned in the V-shaped bright line portion, light intensity at the angle of the lateral portion was not observed to be high, and substantially the same light intensity was observed in any angle distribution. Thus, it was observed that the light to be the V-shaped bright line is concentrated on the lateral portion of a circumference (angle of the lateral portion).

As described above, it was confirmed that the V-shaped bright line is caused by the angle distribution of the incident light, and the light at the angle of the lateral portion becomes the V-shaped bright line. The reason of this is considered to be that the light at the angle of the lateral portion is emitted from the light emitting surface 23b (see FIG. 4) to the front in a vicinity of the light incidence surface 23a. Specifically, because of roughness of the light incidence surface 23a of the light guide plate 22 or influences of the prisms 23e (see FIG. 6) and the prisms 23i (see FIG. 9) formed on the light emitting surface 23b, in a vicinity of the light incidence surface 23a, as to light at the angle of the lateral portion, the incident angle of the light to the rear surface 23c of the light guide 23 becomes the critical angle between the light guide 23 and the low refractive layer 24 or smaller. Thus, the light enters the low refractive layer 24 and is reflected by the prism 24b (see FIG. 5) to the front side. Further, the light is emitted from the light emitting surface 23b to the front. This light is considered to be the V-shaped bright line in a vicinity of the light incidence surface 23a. In other words, it is considered that the V-shaped bright line is caused when light that is not totally reflected by the interface with the low refractive layer 24 leaks to the front side.

Specifically, as illustrated in FIG. 19, for example, among light emitted from the LED with the angle θ1 (e.g. an angle in a range of 65 to 90 degrees), light of a circumference lateral portion (enclose by a broken line in the hatching region) becomes the V-shaped bright line.

In contrast, as illustrated in FIG. 3, because the prisms 23q (inclined surfaces 23r) are formed in the end region 22b of the light guide plate 22, the light at the angle of the lateral portion is reflected by the prisms 23q (inclined surfaces 23r), so that the angle distribution thereof is changed. Thus, entrance of light to the low refractive layer 24 is suppressed (is totally reflected by the interface with the low refractive layer 24), and hence light leakage from the light emitting surface 23b is suppressed. As a result, occurrence of the V-shaped bright line is suppressed.

FIG. 20 illuminates the angle distribution in the light guide plate. Section (A) in FIG. 20 illustrates a state before the light of the circumference lateral portion is reflected by the prisms 23q (inclined surfaces 23r) (initial state), and section (B) in FIG. 20 illustrates a state after the light of the circumference lateral portion is reflected by the prisms 23q (inclined surfaces 23r) (state in the light emitting region). As illustrated in FIG. 20, when the light of the circumference lateral portion is reflected by the prisms 23q (inclined surfaces 23r) (see FIG. 3), the light angle distribution is changed. Thus, the light at the angle of the lateral portion has an incident angle of the light to the rear surface 23c (see FIG. 5) larger than the critical angle between the light guide 23 and the low refractive layer 24. Therefore, in a vicinity of the light incidence surface 23a, light reflection by prisms 24b (see FIG. 5) to the front side is suppressed. As a result, occurrence of the V-shaped bright line is suppressed. In this way, because the prisms 23q (inclined surfaces 23r) (see FIGS. 3 and 10) are formed on the end region 22b, the angle distribution light that becomes the V-shaped bright line is reflected by the prisms 23q (inclined surfaces 23r) so as to change to the angle distribution that does not become the V-shaped bright line. Therefore, the V-shaped bright line is prevented, and the light is effectively used.

Further, as illustrated in FIG. 21, the light in the part enclosed by the broken line in the hatching region is not totally reflected by the low refractive layer 24 after entering the light guide plate 22, and becomes the light component entering the low refractive layer 24 promptly.

Figure 22:
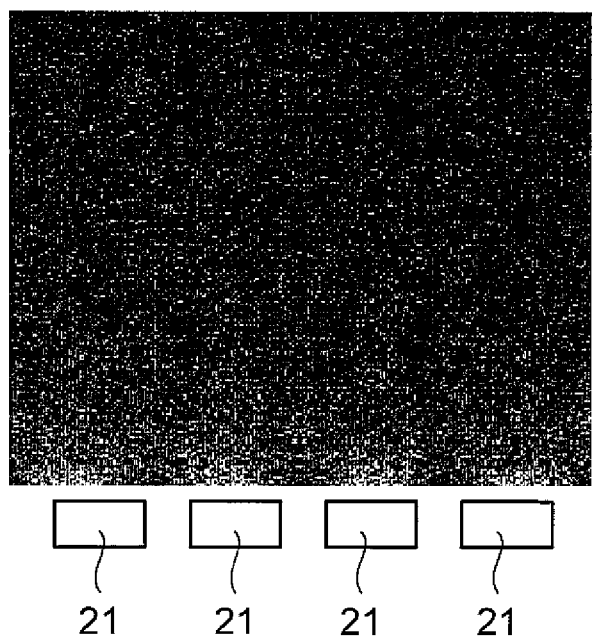
FIG. 22 is a diagram in which emitting light (planar light) from a back-light unit according to an example is derived by simulation.
Figure 23:
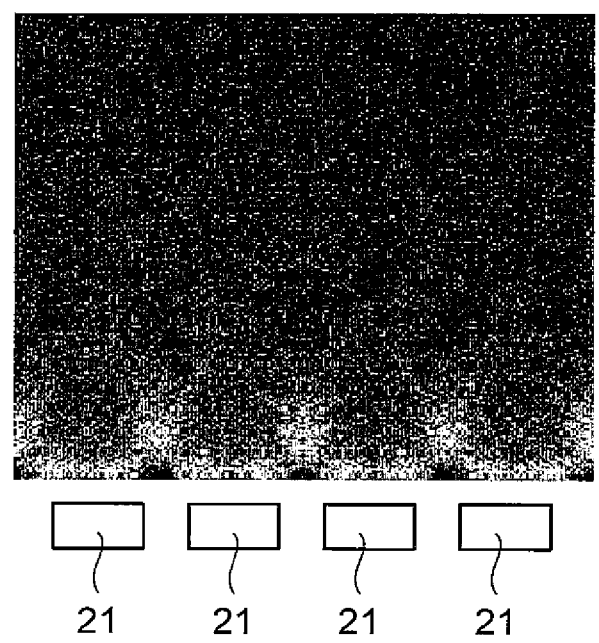
FIG. 23 is a diagram in which emitting light (planar light) from a back-light unit according to a comparative example is derived by simulation.

Next, an effect of suppressing the V-shaped bright line by the prisms 23q (inclined surfaces 23r) (see FIG. 3) was confirmed by simulation. In this simulation, the structure similar to the first embodiment (having the prisms 23q) corresponds to an example, and the structure similar to the example except for that prisms 23q are not disposed corresponds to a comparative example. The result is shown in FIGS. 22 and 23. As illustrated in FIG. 22, in the example with the prisms 23q (see FIG. 3), it was confirmed that the V-shaped bright line was not observed, and high quality planar light without unevenness of luminance was obtained. In contrast, in the comparative example illustrated in FIG. 23, the V-shaped bright line was observed, and unevenness of luminance occurred due to the V-shaped bright line. Thus, it was confirmed that the occurrence of the V-shaped bright line is suppressed so that unevenness of luminance is suppressed by disposing the prisms 23q (see FIG. 3) in the end region 22b of the light guide plate 22.

Further, as illustrated in FIG. 3, the prisms 23i on the light emitting surface 23b are configured to disperse light appropriately unlike the prisms 23q in the end region 22b. Therefore, as illustrated in FIG. 22, it was confirmed that not only the V-shaped bright line but also occurrence of linear unevenness was suppressed.

FIGS. 30 to 35 are diagrams for explaining a manufacturing process of the light guide plate of the back-light unit according to the first embodiment. Next, with reference to FIGS. 30 to 35, the manufacturing process of the light guide plate 22 of the back-light unit 20 according to the first embodiment is described.

Figure 30:
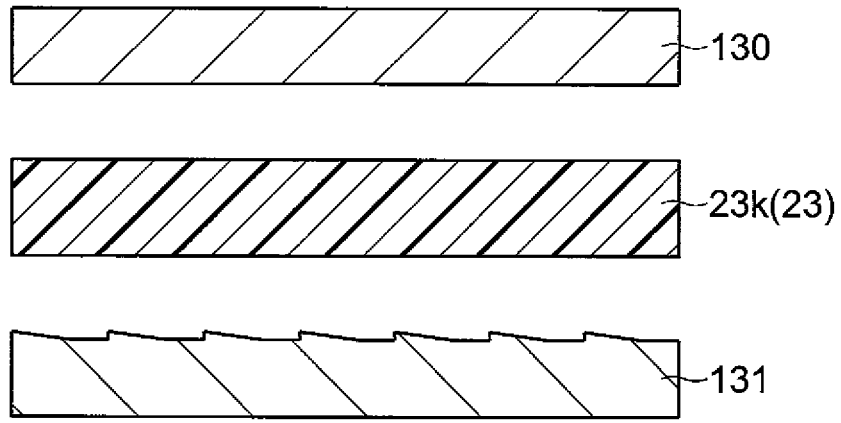
FIG. 30 is a cross-sectional view for explaining manufacturing process of the light guide plate of the back-light unit according to the first embodiment of the present invention.
Figure 31:
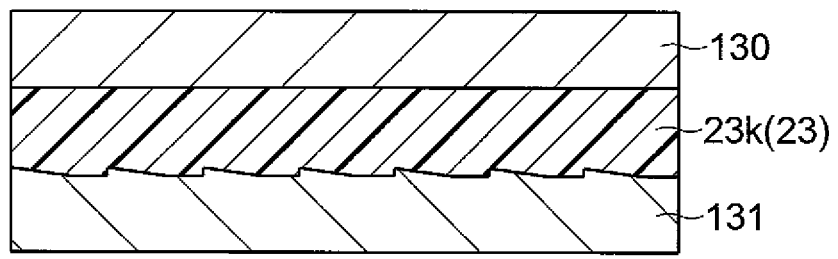
FIG. 31 is a cross-sectional view for explaining manufacturing process of the light guide plate of the back-light unit according to the first embodiment of the present invention.

First, using a thermal imprinting method, the light guide 23 is formed. Specifically, as illustrated in FIG. 30, a film material 23k made of a transparent resin is placed between an upper mold 130 and a lower mold 131. Next, as illustrated in FIG. 31, the film material 23k is heated and pressed by the upper mold 130 and the lower mold 131. Thus, the film material 23k is formed to be a desired shape.

Figure 32:
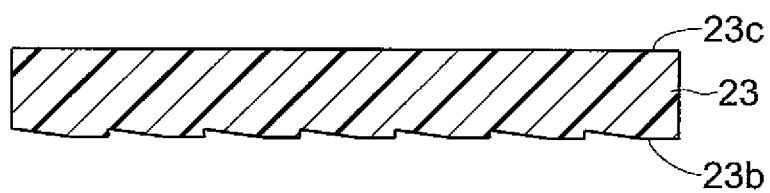
FIG. 32 is a cross-sectional view for explaining manufacturing process of the light guide plate of the back-light unit according to the first embodiment of the present invention.

Further, the film material 23k is separated from the upper mold 130 and the lower mold 131, and is cooled. Then, it is divided into pieces so that the light guide 23 is obtained as illustrated in FIG. 32.

Note that it is possible to use injection molding instead of the imprinting method for molding the light guide 23. However, by using the imprinting method using the film material 23k for molding the light guide 23, it is possible to produce the light guide 23 by a roll-to-roll process. Thus, it is possible to reduce production time and production cost.

Figure 33:
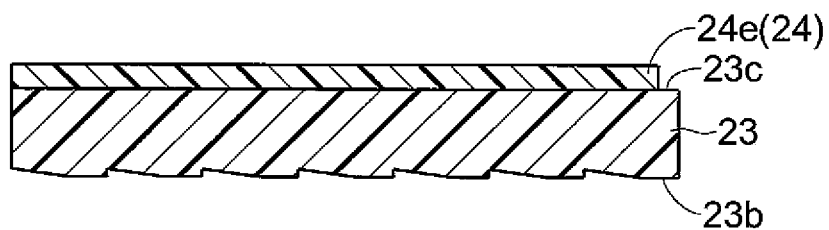
FIG. 33 is a cross-sectional view for explaining a manufacturing process of the light guide plate of the back-light unit according to the first embodiment of the present invention.

Next, using an imprinting method with ultraviolet (UV) light, the low refractive layer 24 is formed on the rear surface 23c of the light guide 23. Specifically, as illustrated in FIG. 33, transparent UV curable resin 24e is applied to the rear surface 23c of the light guide 23. In this case, because the light emitting surface 23b and the rear surface 23c of the light guide 23 are formed to be substantially parallel, it is possible to apply the UV curable resin 24e in a uniform film thickness.

Figure 34:
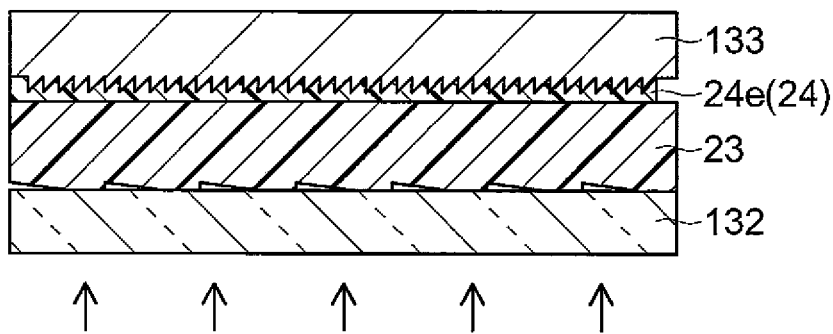
FIG. 34 is a cross-sectional view for explaining the manufacturing process of the light guide plate of the back-light unit according to the first embodiment of the present invention.
Figure 35:
FIG. 35 is a cross-sectional view for explaining the manufacturing process of the light guide plate of the back-light unit according to the first embodiment of the present invention.

Further, as illustrated in FIG. 34, the light guide 23 and the UV curable resin 24e are placed on a quartz substrate 132, and the light guide 23 and the UV curable resin 24e are sandwiched between the quartz substrate 132 and a mold 133. After that, UV light is applied from the quartz substrate 132 side, and hence the UV curable resin 24e is cured to be the low refractive layer 24. Thus, as illustrated in FIG. 35, the light guide plate 22 including the light guide 23 and the low refractive layer 24 formed in a desired shape is obtained.

Note that it is possible to perform the process until forming the low refractive layer 24 by the roll-to-roll process, and afterward to divide into individual light guide plates 22 (light guides 23 and low refractive layers 24).

In the first embodiment, as described above, the plurality of prisms 23e for gradually decreasing the incident angle of the light from the LED 21 to the rear surface 23c of the light guide 23 are disposed on the light emitting surface 23b of the light guide 23, and hence the light from the LED 21 is repeatedly reflected between the light emitting surface 23b and the rear surface 23c of the light guide 23 to be guided, so that the incident angle of the light to the rear surface 23c of the light guide 23 is gradually decreased. Further, when the incident angle of the light to the rear surface 23c of the light guide 23 becomes smaller than the critical angle between the light guide 23 and the low refractive layer 24, the light from the LED 21 enters the low refractive layer 24. For this reason, the expansion angle in the B direction of the light entering the low refractive layer 24 is decreased, and the expansion angle in the B direction of the light reflected by the interface between the rear surface 24a of the low refractive layer 24 and the air layer is also decreased. In other words, the light condensing characteristics can be improved, and luminance of the liquid crystal display panel 10 can be improved. As a result, because it is not necessary to dispose a plurality of optical sheets such as a condensing lens on the light guide plate 22, the back-light unit 20 can be thinner, and an increase of manufacturing cost can be suppressed.

In addition, because it is not necessary to dispose a plurality of optical sheets, there is no light loss when passing through the optical sheets (for example, there is no light loss due to multiple reflections among the sheets). Thus, use efficiency of light can be improved.

In addition, the plurality of prisms 23e for gradually decreasing the incident angle of the light to the rear surface 23c of the light guide 23 are disposed, and hence the light from the LED 21 is repeatedly reflected between the light emitting surface 23b and the rear surface 23c of the light guide 23 to be guided. Thus, as being farther from the LED 21, the incident angle to the rear surface 23c of the light guide 23 becomes smaller, and the light can enter the low refractive layer 24 more easily. In this way, it is possible to realize uniform amount of light entering the low refractive layer 24 between a part close to the LED 21 with large amount of light (light rays) and a part distant from the LED 21 with small amount of light (light rays). As a result, the light can emit uniformly from the entire light emitting region 22a of the light guide plate 22, and hence uniform luminance of the liquid crystal display panel 10 can be achieved.

In addition, in the first embodiment, the plurality of prisms 24b for reflecting the light from the LED 21 to the front are formed in substantially the entire rear surface 24a of the low refractive layer 24 in the light emitting region 22a of the light guide plate 22, and hence the light can be uniformly reflected by the plurality of prisms 24b in the light emitting region 22a of the light guide plate 22. Thus, because the light can be emitted more uniformly from the entire light emitting region 22a of the light guide plate 22, occurrence of dot unevenness can be suppressed, and more uniform luminance of the liquid crystal display panel 10 can be achieved.

In addition, in the first embodiment, because the plurality of prisms 24b have the function of totally reflecting the light from the LED 21, it is possible to prevent the light entering the low refractive layer 24 from the light guide 23 from emitting from the rear surface 24a of the low refractive layer 24. Thus, because occurrence of light loss can be suppressed, use efficiency of light can be improved more.

Here, as described above, because the region S1 without the prisms 23e and the region S2 with the prisms 23e have different luminance values, a boundary between them can be easily visually recognized. Therefore, in the first embodiment, the prisms 23e are formed to begin from the end region 22b. Thus, the boundary between the region S1 without the prisms 23e and the region S2 with the prisms 23e is in the end region 22b, and hence the boundary is not included in the light emitting region 22a. Therefore, the boundary cannot be visually recognized, and light can be uniformly emitted from the light emitting region 22a.

In addition, because the prisms 23e are formed to begin from the position separated by the predetermined distance D30 from the light incidence surface 23a (incidence surface) in the end region 22b, emitting light intensity in the end region 22b can be reduced to be smaller than the case where the prisms 23e are formed to begin from the light incidence surface 23a (position L0), for example. Therefore, light loss can be reduced. Note that if the beginning position L1 of the prisms 23e becomes close to the light incidence surface 23a (position L0), emitting light intensity in the non-display area (end region 22b) increases so that amount of light to be a loss increases. For this reason, it is preferred that the beginning position L1 of the prisms 23e should be closer to the beginning position L2 of the light emitting region 22a (display area).

In this way, in the first embodiment, it is possible to emit light uniformly and efficiently in the light emitting region 22a. Therefore, it is possible to provide a back-light unit having good illumination quality.

In addition, in the first embodiment, the prisms 24b are formed in the rear surface 24a of the low refractive layer 24 (rear surface of the light guide plate 22), and the beginning position L3 of the prisms 24b is closer to the LED 21 than the beginning position L1 of the prisms 23e. Thus, the light that may cause unevenness of luminance is reflected by the prisms 24b so as to emit from the end region 22b. For this reason, it is possible to prevent such light from being guided to the light emitting region 22a so as to emit from the light emitting region 22a. In other words, it is possible to prevent the light that may cause unevenness of luminance from emitting from the light emitting region. Thus, occurrence of unevenness of luminance can be suppressed.

In addition, in the first embodiment, prisms 23q are formed in the end region 22b of the light guide 23 on the LED 21 side, and hence the light from the LED 21 entering the light guide 23 can be reflected by the prism 23q. The prisms 23q can change the propagation angle of light expanding in the lateral direction more largely than the prisms 23i. For this reason, the expansion of light in the lateral direction can be suppressed by the prisms 23q. The V-shaped bright line is caused by the light expanding in the lateral direction in the light guide 23. Therefore, because the expansion of light in the lateral direction is suppressed by the prisms 23q, occurrence of the V-shaped bright line can be effectively suppressed. Note that by suppressing occurrence of the V-shaped bright line, the light that becomes the V-shaped bright line can be used effectively so that use efficiency of light and luminance can be improved effectively.

In addition, the prisms 23i formed in the light emitting region 22a of the light guide 23 are configured to have a smaller effect of changing the propagation angle of light expanding in the lateral direction than the prism 23q, and hence the light can be appropriately dispersed by the prisms 23i in the light emitting region 22a. Thus, occurrence of linear unevenness can be suppressed.

In this way, in the first embodiment, the prisms 23q are formed in the end region 22b of the light guide 23 (in a vicinity of the light incident portion), and the prisms 23i are formed in the light emitting region 22a. Thus, occurrence of the V-shaped bright line and linear unevenness can be effectively suppressed. For this reason, because the unevenness of luminance can be effectively improved, planar light having good uniformity can be obtained. In other words, in the planar light emitted from the back-light unit 20, occurrence of unevenness of luminance due to the V-shaped bright line and the linear unevenness can be effectively suppressed. As a result, it is possible to provide the back-light unit 20 having high uniformity of luminance. In addition, the light that causes the V-shaped bright line and the linear unevenness can be effectively used, and hence use efficiency of light and luminance can be effectively improved.

In addition, because the prisms 23q in the end region 22b reflect the light entering the light guide 23 in the direction approaching the optical axis O of the light from the LED 21, component light that becomes the V-shaped bright line can be effectively changed to component light that does not become the V-shaped bright line. Thus, occurrence of the V-shaped bright line can be suppressed more effectively, and hence occurrence of unevenness of luminance due to the V-shaped bright line can be effectively suppressed in the planar light emitted from the back-light unit 20.

Further, the prism 23q and the prism 23i may have different shapes, and hence the propagation angle of light expanding in the lateral direction can be easily changed between the prisms 23q and the prisms 23i.

In addition, the prisms 23q (inclined surfaces 23r) are formed to extend from the light incidence surface 23a in the substantially perpendicular direction (B direction), viewed in a plan view, and hence the propagation angle of light expanding in the lateral direction can be easily changed when the light entering the light guide 23 is reflected by the inclined surfaces 23r (prisms 23q). Thus, occurrence of the V-shaped bright line can be easily suppressed. In addition, the prisms 23i (inclined surfaces 23j) are formed to extend in the direction (B direction) substantially perpendicular to the light incidence surface 23a, viewed in a plan view, and hence the light can be appropriately dispersed when the light is reflected by the inclined surfaces 23j (prisms 23i). Thus, occurrence of linear unevenness can be effectively suppressed.

In addition, in the first embodiment, the light emitting surface 23b and the rear surface 23c of the light guide 23 are formed to be substantially parallel, and hence the low refractive layer 24 can be easily formed on the rear surface 23c of the light guide 23 compared with a case of using a wedge-shaped light guide having a rear surface inclined to the light emitting surface.

In addition, in the first embodiment, the prism 23e has the inclined surface 23f inclined to the light emitting surface 23b of the light guide 23, and hence the incident angle of the light from the LED 21 to the rear surface 23c of the light guide 23 can be easily gradually decreased.

In addition, in the first embodiment, the inclined surface 23f is inclined to the light emitting surface 23b of the light guide 23 by 5 degrees or smaller (0.1 degrees or larger and 3 degrees or smaller), and hence the light is repeatedly reflected between the prism 23e and the rear surface 23c. Thus, the incident angle of the light to the rear surface 23c of the light guide 23 is decreased step by step by 10 degrees or smaller (0.2 degrees or larger and 6 degrees or smaller). Thus, the incident angle of the light to the rear surface 23c of the light guide 23 can be easily gradually decreased.

In addition, in the first embodiment, the flat surface portion 23d is formed between the prisms 23e neighboring in the B direction, and hence it is possible to prevent the light emitted from light guide 23 from being split.

In addition, in the first embodiment, the plurality of prisms 24b are formed continuously without a gap in the B direction, and hence the light can be reflected by the plurality of prisms 24b more uniformly. Therefore, the light can be emitted more uniformly from the entire light emitting region 22a of the light guide plate 22. Thus, more uniform luminance of the liquid crystal display panel 10 can be achieved.

In addition, in the first embodiment, the plurality of prisms 24b are formed to have the same shape and the same size, and hence the light can be more uniformly reflected by the plurality of prisms 24b. Therefore, the light can be more uniformly emitted from the entire light emitting region 22a of the light guide plate 22.

In addition, in the first embodiment, the plurality of prisms 23i for dispersing the light from the LED 21 in the A direction are formed on the light emitting surface 23b of the light guide 23 (light emitting region 22a), and hence the light can be appropriately dispersed in the A direction in the light guide 23. Therefore, luminance of a front portion of the LED 21 of the liquid crystal display panel 10 can be the same as luminance of other portion than the front portion of the LED 21 of the liquid crystal display panel 10. In other words, more uniform luminance of the liquid crystal display panel 10 can be achieved. In addition, because occurrence of linear unevenness can be suppressed by forming the prisms 23i, unevenness of luminance can be effectively suppressed.

In addition, because the plurality of prisms 23i for dispersing the light from the LED 21 in the A direction are formed, light having a large incident angle to the rear surface 23c of the light guide 23 viewed from the light incidence surface 23a side of the light guide 23 is reflected by the prisms 23i. Thus, the incident angle to the rear surface 23c of the light guide 23 can be decreased. In this way, because expansion of the light entering the low refractive layer 24 in the A direction can be suppressed, expansion of the light emitted from the light guide plate 22 in the A direction can be suppressed. As a result, light condensing characteristics of the light in the A direction can be improved, and luminance of the liquid crystal display panel 10 can be improved more.

In addition, in the first embodiment, the prism 23i is formed by the pair of inclined surfaces 23j, and hence the light from the LED 21 can be dispersed by the pair of inclined surfaces 23j on both sides in the A direction. Therefore, more uniform luminance of the liquid crystal display panel 10 can be achieved.

In addition, in a case of using the LED 21 as the light source, luminance of the front portion of the LED 21 of the liquid crystal display panel 10 is apt to be different from luminance of other portion than the front portion of the LED 21 of the liquid crystal display panel 10. Therefore, it is particularly effective to dispose the plurality of prisms 23i for dispersing the light from the LED 21 in the A direction, as described above.

In addition, because the back-light unit 20 is equipped, it is easy to provide the liquid crystal display device 1 with high display quality in which unevenness of luminance is suppressed.

Figure 36:
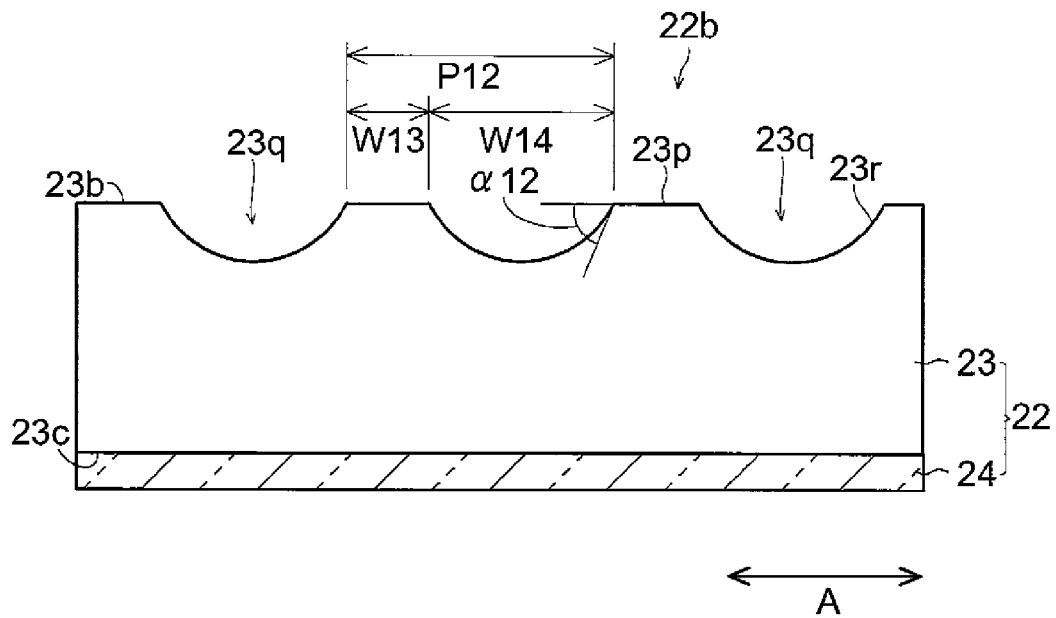
FIG. 36 is a diagram corresponding to a cross section taken along the a1-a1 line in FIG. 3 (illustrating other example).
Figure 37:
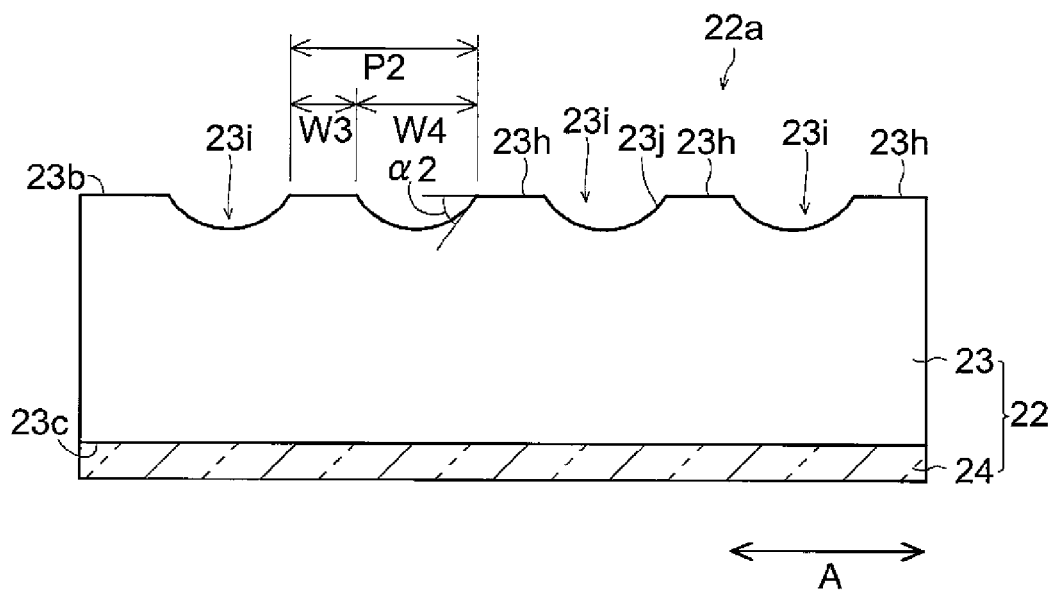
FIG. 37 is a diagram corresponding to a cross section taken along the a2-a2 line in FIG. 3 (illustrating other example).

Further, in the embodiment described above, there is described the case where each of the prisms 23q in the end region 22b and the prisms 23i in the light emitting region 22a is formed to have a cross section having a triangular shape. However, the cross sectional shapes of the prisms 23q and 23i may be other than the triangular shape. The shapes of the prisms 23q and 23i are not limited particularly as long as they have an inclined surface that can reflect light so as to change the light guide angle. For instance, as illustrated in FIG. 36, the prisms 23q in the end region 22b may be formed to have an arcuate cross section (curved inclined surface). Similarly, as illustrated in FIG. 37, the prisms 23i in the light emitting region 22a may be formed to have a circular cross section. In addition, FIG. 36 corresponds to FIG. 12 described above, and FIG. 37 corresponds to FIG. 13 described above.

Second Embodiment

Figure 38:
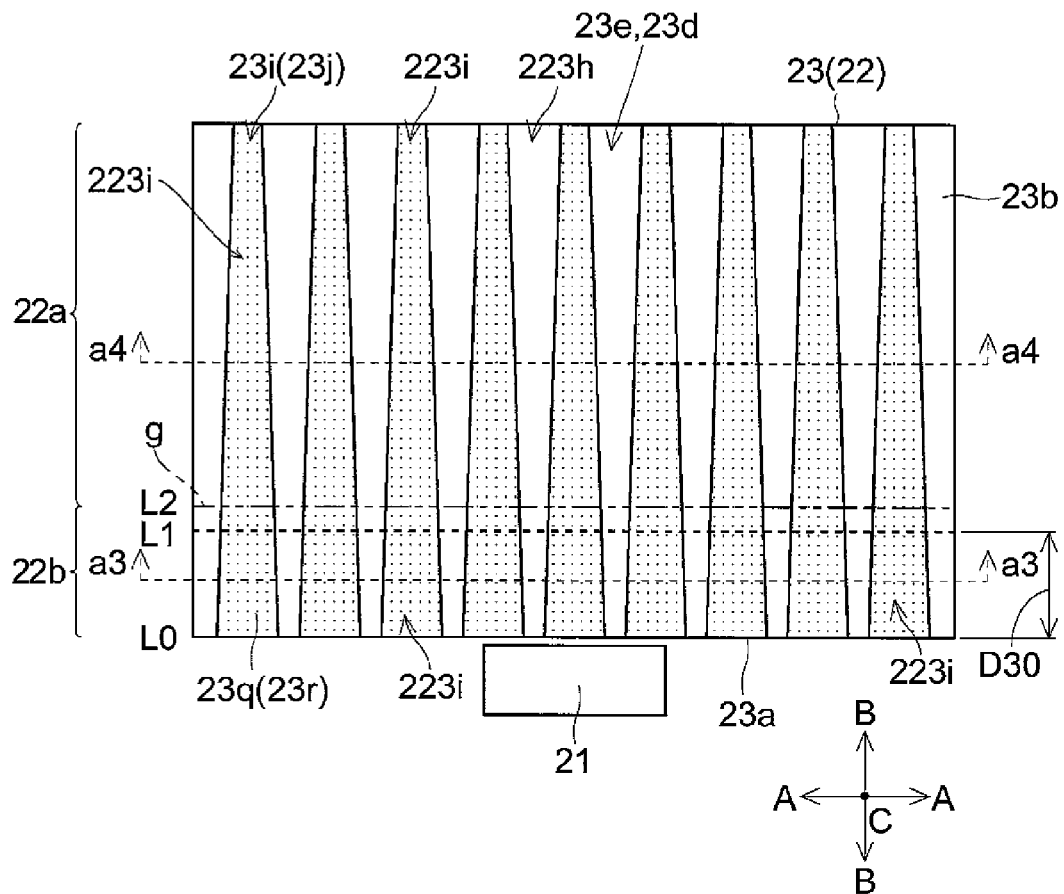
FIG. 38 is a plan view schematically illustrating a part of a back-light unit according to a second embodiment of the present invention.
Figure 39:
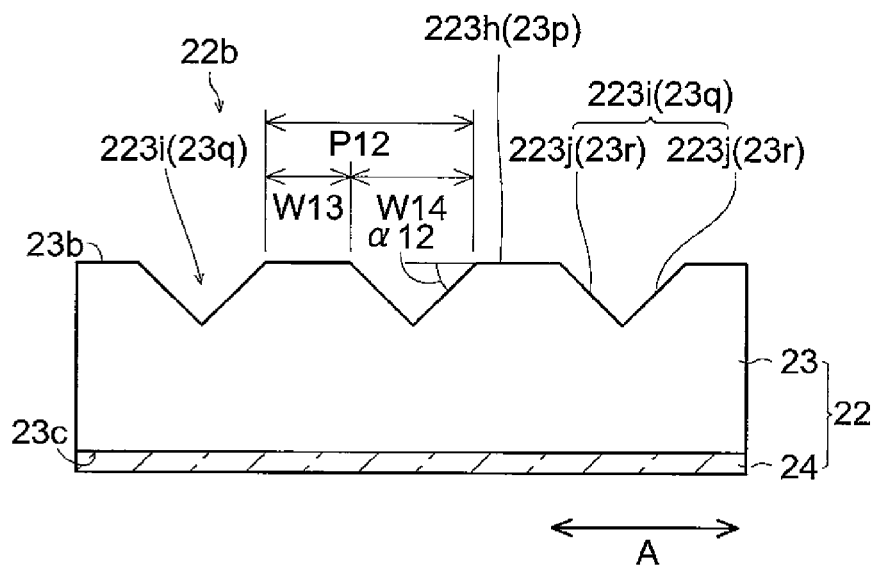
FIG. 39 is a cross-sectional view taken along a3-a3 line in FIG. 38.
Figure 40:
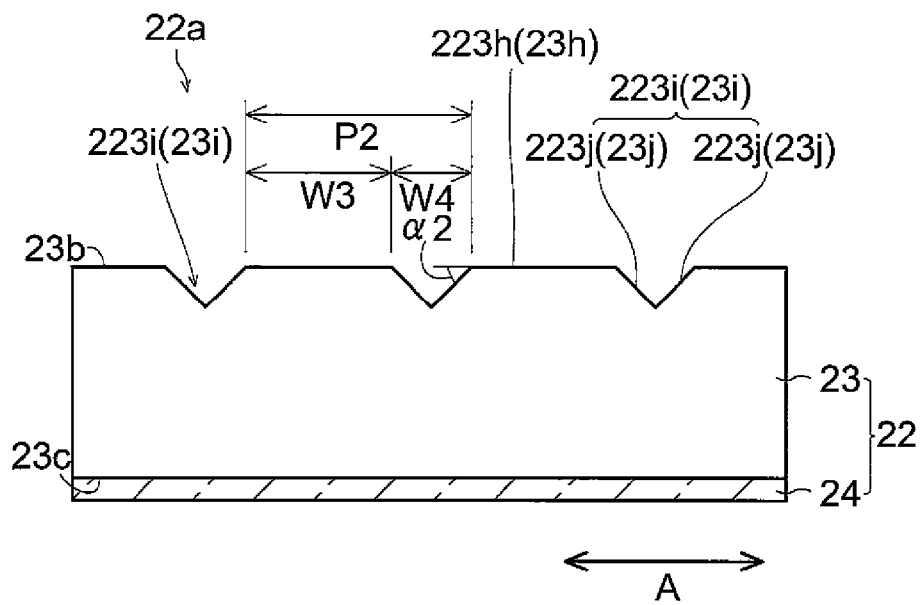
FIG. 40 is a cross-sectional view taken along a4-a4 line in FIG. 38.
Figure 41:
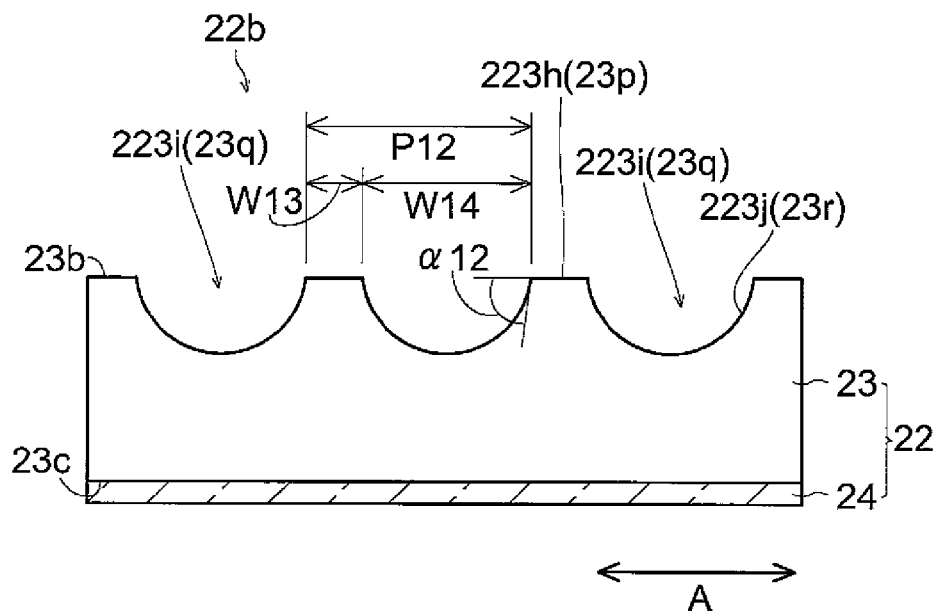
FIG. 41 is a diagram corresponding to a cross section taken along the a3-a3 line in FIG. 38 (illustrating other example).
Figure 42:
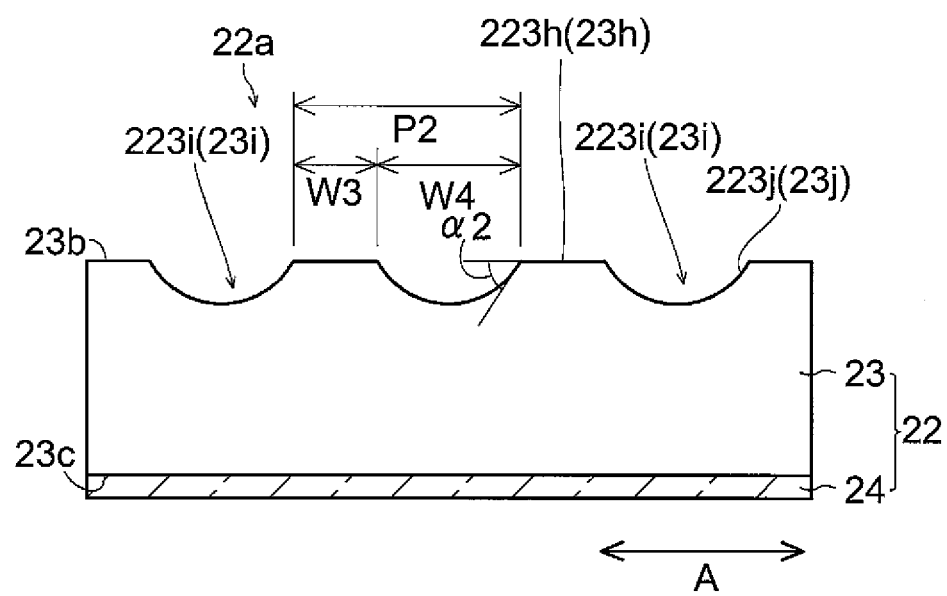
FIG. 42 is a diagram corresponding to a cross section taken along the a4-a4 line in FIG. 38 (illustrating other example).

FIG. 38 is a plan view schematically illustrating a part of a back-light unit according to a second embodiment of the present invention. FIG. 39 is a cross-sectional view taken along the a3-a3 line in FIG. 38, and FIG. 40 is a cross-sectional view taken along the a4-a4 line in FIG. 38. FIGS. 41 and 42 are cross-sectional views illustrating other examples of the second embodiment. FIG. 41 illustrates a diagram corresponding to the cross section taken along the a3-a3 line in FIG. 38, and FIG. 42 illustrates a diagram corresponding to the cross section taken along the a4-a4 line in FIG. 38. Next, with reference to FIGS. 3 and 38 to 42, the back-light unit according to the second embodiment of the present invention is described. Note that in the diagrams, corresponding components are denoted by the same numeral so that overlapping description is appropriately omitted.

In the second embodiment, as illustrated in FIG. 38, a plurality of concave prisms 223i (recesses) are formed to continuously extend from the end region 22b to the light emitting region 22a. In other words, in the second embodiment, separate prisms are not formed in the end region 22b and in the light emitting region 22a, but the prism in the end region 22b and the prism in the light emitting region 22a are continuous in shape. More specifically, the prism 23i and the prism 23q formed separately in the first embodiment correspond to the prism 223i having a continuous shape formed on the light guide 23.

The prism 223i formed on the front surface 23b of the light guide 23 is formed to have a triangular cross section as illustrated in FIGS. 39 and 40. In addition, the prism 223i has a pair of inclined surfaces 223j. Further, the prism 223i is formed to extend in the normal direction (B direction) to the light incidence surface 23a.

In addition, a flat surface portion 223h is formed between the prisms 223i neighboring in the A direction. In addition, between the prisms 223i neighboring in the A direction, similarly to the first embodiment, the plurality of flat surface portions 23d and the plurality of concave prisms 23e are alternately formed. Further, the prisms 23e are formed to begin from a position closer to the light incidence surface 23a (LED 21 side) than the light emitting region 22a (display area). Specifically, the prisms 23e begin from the position L1 (the predetermined position inside the end region 22b) separated from the light incidence surface 23a by the predetermined distance D30 in the B direction.

As illustrated in FIGS. 38 to 40, a depth of the prism 223i becomes larger as being closer to the light incidence surface 23a (see FIG. 38). Because an inclination angle of the inclined surface 223j of the prism 223i is constant, a width in the A direction is also increased as the depth of the prism 223i is increased. Therefore, the width in the A direction of the prism 223i becomes larger as being closer to the light incidence surface 23a. Thus, an occupying area (occupancy ratio) of the prisms 223i (inclined surfaces 223j) is larger in the end region 22b than in the light emitting region 22a.

When the occupying area (occupancy ratio) of the prisms 223i (inclined surfaces 223j) becomes large, expansion of the light in the lateral direction is suppressed so that occurrence of the V-shaped bright line is suppressed. On the other hand, in the light emitting region 22a, if the occupancy ratio is the same as that in the end region 22b, linear unevenness is emphasized.

Therefore, in the second embodiment, the light guide 23 is configured in such a manner that the occupying area (occupancy ratio) of the prisms 223i (inclined surfaces 223j) is large in the end region 22b, and that the occupying area (occupancy ratio) of the prisms 223i (inclined surfaces 223j) is small in the light emitting region 22a. Therefore, occurrence of the V-shaped bright line and linear unevenness is effectively suppressed.

The prisms 223i configured as described above has a role of the prisms 23q of the first embodiment (see FIG. 3) in the end region 22b and a role of the prisms 23i of the first embodiment (see FIG. 3) in the light emitting region 22a. In other words, the roles of the prisms 23q and the prisms 23i can be performed only by the prisms 223i.

Further, because the inclination angle of the inclined surface 223j is the same between the end region 22b and the light emitting region 22a, the inclination angle α12 in FIG. 39 is the same as the inclination angle α2 in FIG. 40 (α2=α12). In addition, a pitch in the A direction of the prisms 223*i* is not changed depending on a place. Therefore, the pitch P12 of the prisms 223*i* in the end region 22*b* (see FIG. 39) is the same as the pitch P2 of the prisms 223*i* in the light emitting region 22*a* (see FIG. 40) (W13+W14=W3+W4). The width in the A direction of the prism 223*i* is larger in the end region 22*b* than in the light emitting region 22*a*. On the contrary, the width of the flat surface portion 223*h* is smaller in the end region 22*b* than in the light emitting region 22*a*. Therefore, relationships of W14>W4 and W13<W3 are satisfied.

Other structures of the second embodiment are the same as those of the first embodiment.

In the second embodiment, as described above, by forming the concave prisms 223*i* so as to continuously extend from the end region 22*b* to the light emitting region 22*a*, occurrence of the V-shaped bright line and linear unevenness can be easily effectively suppressed.

Other effects of the second embodiment are the same as those of the first embodiment.

Further, in the embodiment described above, a case where the prisms 223*i* are formed to have a triangular cross section is exemplified. However, the prisms 223*i* may have a cross sectional shape other than the triangular shape. For instance, as illustrated in FIGS. 41 and 42, the prisms 223*i* may be formed to have an arcuate cross section (having a curved inclined surface).

Here, if the cross section has an arcuate shape, when the depth of the prism 223*i* increases, not only the width in the A direction but also an inclination angle of the inclined surface 223*j* is also increased. When the inclination angle is increased, the effect of suppressing the V-shaped bright line is increased. Therefore, by forming the prisms 223*i* to have an arcuate cross section, occurrence of the V-shaped bright line can be more effectively suppressed.

If the cross section of the prism 223*i* has an arcuate shape, the inclination angle of the inclined surface 223*j* becomes larger in the end region 22*b* (see FIG. 41) than in the light emitting region 22*a* (see FIG. 42) (α12>α2). The pitch in the A direction of the prism 223*i* is not changed depending on a place. Therefore, the pitch P12 of the prisms 223*i* in the end region 22*b* (see FIG. 41) is the same as the pitch P2 of the prisms 223*i* in the light emitting region 22*a* (see FIG. 42) (W13+W14=W3+W4). The width in the A direction of the prism 223*i* is larger in the end region 22*b* than in the light emitting region 22*a*. On the contrary, the width of the flat surface portion 223*h* is smaller in the end region 22*b* than in the light emitting region 22*a*. Therefore, relationships of W14>W4 and W13<W3 are satisfied.

Third Embodiment

Figure 43:
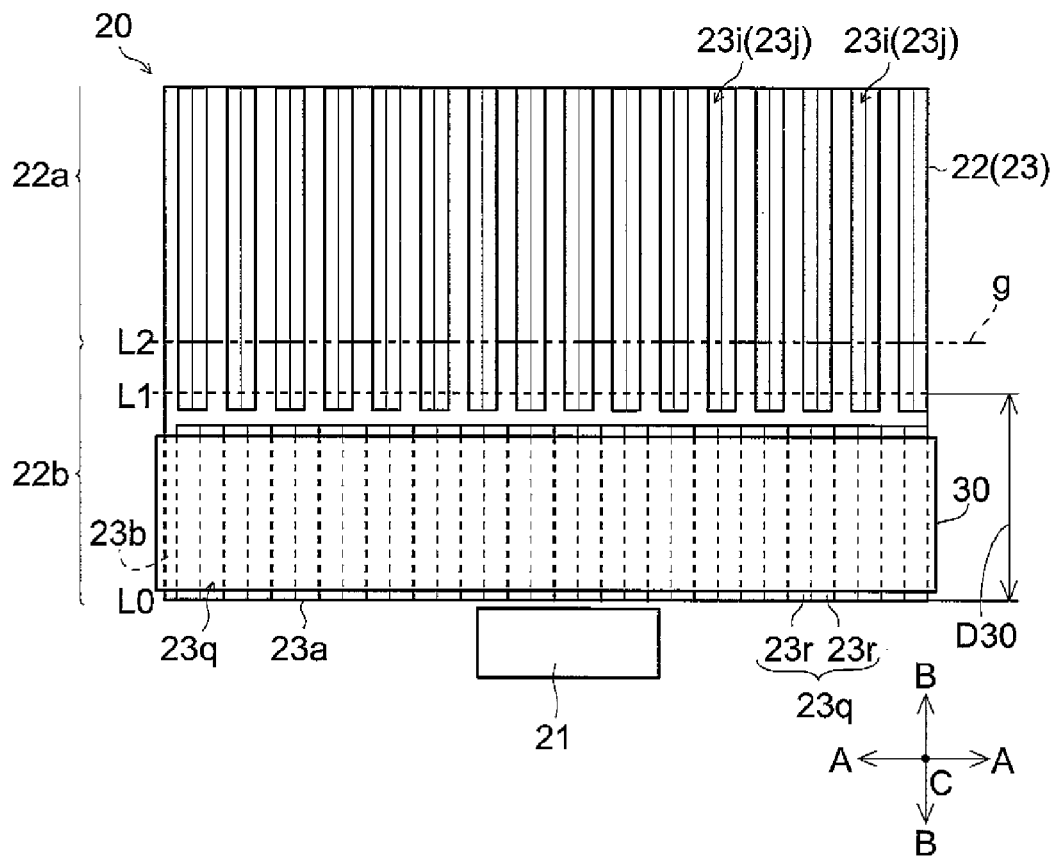
FIG. 43 is a plan view schematically illustrating a part of a back-light unit according to a third embodiment of the present invention.
Figure 44A:
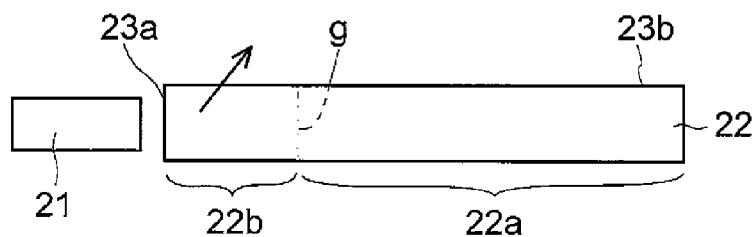
FIG. 44 is a schematic cross-sectional view for explaining the back-light unit according to the third embodiment of the present invention.
Figure 44B:
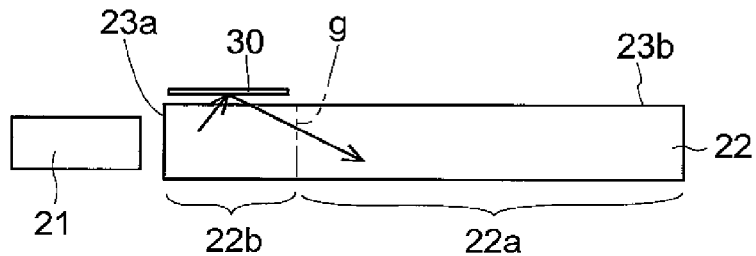

FIG. 43 is a plan view schematically illustrating a part of a back-light unit according to a third embodiment of the present invention. FIG. 44 is a schematic cross-sectional view for describing the back-light unit according to the third embodiment of the present invention. Next, with reference to FIGS. 43 and 44, the back-light unit according to the third embodiment of the present invention is described. Note that in the diagrams, corresponding components are denoted by the same numeral so that overlapping description is appropriately omitted.

In the third embodiment, as illustrated in FIG. 43, a reflection layer 30 is disposed on the entire or a part of the end region 22*b* (a vicinity of the light incident portion) in the first embodiment. The reflection layer 30 is constituted of a silver-coated reflective plate or a reflective sheet made of white color PET resin or the like, for example. The reflection layer 30 may be disposed on the light guide plate 22 (light guide 23) or is intimately connected with the light guide plate 22 (light guide 23) via an adhesive layer (not shown). In addition, it is possible to directly form a reflective film made of aluminum or silver having high reflectance on the light guide plate 22 so as to form the reflection layer 30.

If the reflection layer 30 does not exist in the region (end region 22*b*) of the light guide plate 22 in which the prisms 23*q* are formed, a part of light applied to the inclined surface 23*r* of the prism 23*q* is emitted into the air as illustrated in (A) of FIG. 44 (see an arrow). In this case, the light emitted into the air is lost (becomes a loss).

On the other hand, as illustrated in FIG. 43, if the reflection layer 30 is disposed in the region (end region 22*b*) of the light guide plate 22 in which the prisms 23*q* are formed, the above-mentioned light is also reflected by the reflection layer 30 as illustrated in (B) of FIG. 44. Thus, the light enters again into the light guide plate 22.

Other structures of the third embodiment are the same as those of the first embodiment. Note that it is possible to adopt a structure in which the reflection layer 30 is added in the structure of the second embodiment.

In the third embodiment, as described above, by disposing the reflection layer 30 on the prism 23*q* (in the end region 22*b*) so as to reflect the light emitted from the prism 23*q* to the outside, the light emitted to the air layer (in the air), for example, can be reflected by the reflection layer 30 so as to enter the light guide 23. Thus, light loss can be reduced, and hence light use efficiency can be improved.

Other effects of the third embodiment are the same as those of the first embodiment. In addition, if the reflection layer 30 is added to the structure of the second embodiment, other effects of the third embodiment are the same as those of the first and second embodiments.

Fourth Embodiment

Figure 45:
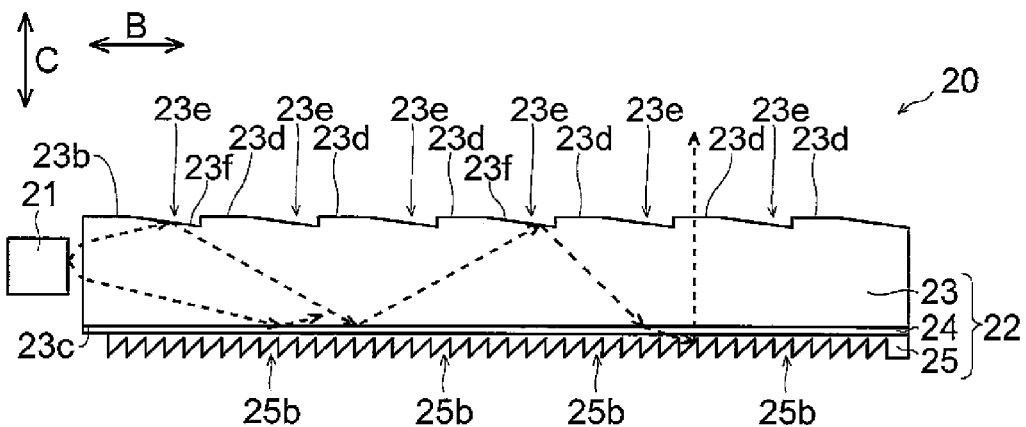
FIG. 45 is a cross-sectional view schematically illustrating a back-light unit according to a fourth embodiment of the present invention.

FIG. 45 is a cross-sectional view schematically illustrating a back-light unit according to a fourth embodiment of the present invention. Next, with reference to FIG. 45, the back-light unit according to the fourth embodiment of the present invention is described. Note that in FIG. 45, a corresponding component is denoted by the same numeral so that overlapping description is appropriately omitted.

In the fourth embodiment, as illustrated in FIG. 45, a prism layer 25 is further formed in addition to the low refractive layer 24 on the rear surface 23*c* of the light guide 23. Specifically, the low refractive layer 24 is sandwiched between the light guide 23 and the prism layer 25. The prism layer 25 is made of a transparent material having a refractive index (n3) and is formed on the under surface (rear surface) of the low refractive layer 24 without an air layer between them. In this case, it is preferred that the refractive index (n1) of the light guide 23, the refractive index (n2) of the low refractive layer 24, and the refractive index (n3) of the prism layer 25 have a relationship of n2<n3<n1.

In addition, in the fourth embodiment, on the rear surface of the prism layer 25 (on the rear surface of the light guide plate 22), there is formed prisms 25*b* capable of condensing light utilizing total reflection. The prism 25*b* has the same shape as the prism 24*b* described above in the first embodiment (see FIG. 1). In other words, in the fourth embodiment, instead of the prisms 24*b* formed on the low refractive layer 24, the prisms 25*b* are formed on the prism layer 25. Note that the prisms 25*b* are an example of the "second reflection portion" of the present invention.

Other structures of the fourth embodiment are the same as those of the first to third embodiments. In addition, effects of the fourth embodiment are the same as those of the first to third embodiment.

Fifth Embodiment

Figure 46:
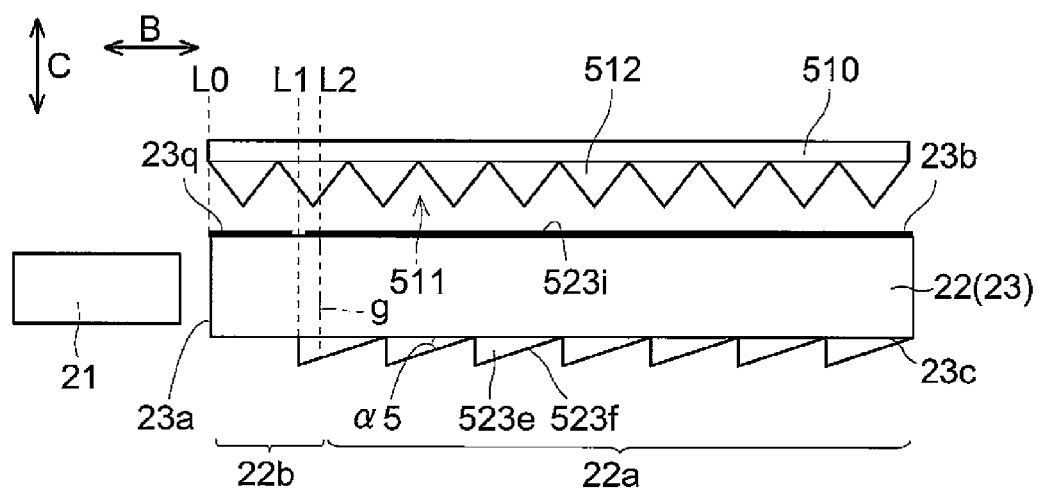
FIG. 46 is a cross-sectional view schematically illustrating a back-light unit according to a fifth embodiment of the present invention.
Figure 47:
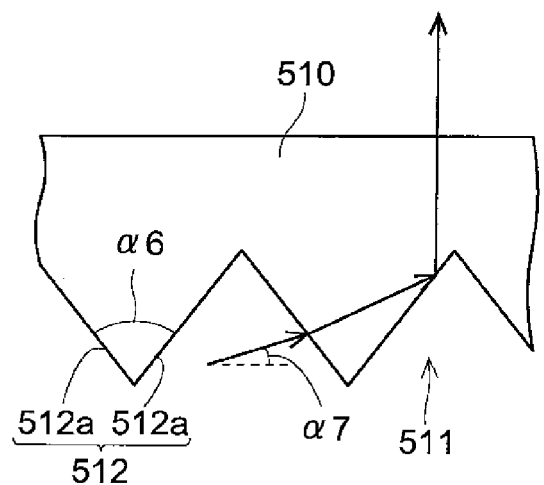
FIG. 47 is an enlarged cross-sectional view illustrating a part of a prism sheet illustrated in FIG. 46.

FIG. 46 is a cross-sectional view schematically illustrating a back-light unit according to a fifth embodiment of the present invention. FIG. 47 is an enlarged cross-sectional view of a part of the prism sheet illustrated in FIG. 46. Next, with reference to FIGS. 1, 9, 46 and 47, the back-light unit according to the fifth embodiment of the present invention is described. Note that in the diagrams, corresponding components are denoted by the same numeral so that overlapping description is appropriately omitted.

In the fifth embodiment, as illustrated in FIG. 46, an inverted prism system (turning lens system) back-light unit is described. Specifically, unlike the first to fourth embodiments, the light guide plate 22 constituting the back-light unit does not include the low refractive layer. In other words, in the fifth embodiment, the light guide plate 22 is constituted of the light guide 23.

In addition, in the fifth embodiment, prisms 523e having the same function as the prisms 23e (see FIG. 1) are formed on the rear surface 23c (under surface) of the light guide plate 22 (light guide 23), for example, and prisms 523i or embossed patterns 523i having the same function as the prism 23i (see FIG. 9) are formed on the front surface 23b (upper surface) of the light guide plate 22 (light guide 23). The prisms 523e formed on the rear surface 23c of the light guide plate 22 (light guide 23) have inclined surfaces 523f inclined at an inclination angle α5. The inclination angle α5 of the inclined surface 523f is approximately 1 to 2 degrees, for example. Note that the prisms 523e should be formed on either one of the front surface 23b (upper surface) and the rear surface 23c (under surface) of the light guide plate 22 (light guide 23). The prisms 523i or the embossed patterns 523i should be formed on either one of the front surface 23b (upper surface) and the rear surface 23c (under surface) of the light guide plate 22.

Further, in the fifth embodiment, a prism sheet 510 (single-sided prism sheet) having a prism surface 511 is disposed on the light guide plate 22. The prism sheet 510 is disposed so as to overlap the light guide plate 22 (light guide 23). The prism surface 511 of the prism sheet 510 is opposed to the front surface 23b of the light guide plate 22 (light guide 23). A plurality of prisms 512 are formed on the prism surface 511 of the prism sheet 510. These prisms 512 are formed to have a triangular cross-sectional shape. In addition, as illustrated in FIG. 47, each of the plurality of prisms 512 has a pair of inclined surfaces 512a. An angle α6 between the pair of inclined surfaces 512a (vertex angle α6 of the prism 512) is approximately 65 to 70 degrees, for example. Note that the prisms 523i and the embossed patterns 523i are an example of the "third reflection portion" of the present invention, and the prism sheet 510 is an example of the "optical sheet" of the present invention.

An air layer is disposed between the prism sheet 510 and the light guide plate 22. This air layer has a role of the low refractive layer described in the first to fourth embodiments.

In addition, similarly to the first to fourth embodiments, the prisms 523e are formed to begin from a position closer to the light incidence surface 23a than the light emitting region 22a (display area). In detail, the prisms 523e begin from the position L1 (the predetermined position inside the end region 22b) separated from the light incidence surface 23a by the predetermined distance D30 in the B direction. Note that the flat surface portion may be formed between the prisms 523e neighboring in the B direction (for example, a length direction of the light guide plate 22) similarly to the first embodiment.

In the back-light unit of the turning lens system, as illustrated in FIG. 46, the light from the LED 21 enters through the light incidence surface 23a and is guided in the light guide plate 22 (light guide 23) to be emitted from the front surface 23b of the light guide plate 22 toward the prism sheet 510. The light is emitted from the front surface 23b (light emitting surface 23b) of the light guide plate 22 with an angle α7 of approximately 20 degrees, for example, as illustrated in FIG. 47, and enters the prism 512 of the prism sheet 510. Further, the incident light is totally reflected by the prism sheet 510 to the front (see an arrow).

In the back-light unit of the turning lens system configured as described above, as illustrated in FIG. 46, the light entering the light guide plate 22 has an expansion (for example, Gauss dispersion) due to existence of a surface roughness by machining of the light incidence surface 23a. Further, when the expanded light is applied to the prism 523i or the embossed pattern 523i formed on the front surface 23b of the light guide plate 22, for example, the angle becomes the critical angle or smaller in the end region 22b (in a vicinity of the light incident portion), and hence the V-shaped bright line occurs. In other words, the V-shaped bright line is apt to occur also in the back-light unit of the turning lens system.

Therefore, in the fifth embodiment, similarly to the first to fourth embodiments, the prisms 23q are formed in the end region 22b. Note that the prisms 23q may be formed on either one of the front surface 23b and the rear surface 23c of the light guide plate 22 (light guide 23). FIG. 46 illustrates an example where the prisms 23q are formed on the front surface 23b of the light guide plate 22.

In addition, similarly to the first to fourth embodiments, the prisms 23q are formed in such a manner that the propagation angle of light expanding in the lateral direction (A direction) is changed more largely than the prisms 523i or the embossed patterns 523i. Therefore, in the fifth embodiment too, occurrence of the V-shaped bright line and linear unevenness are effectively suppressed.

In the fifth embodiment, as described above, by adopting the back-light unit of the turning lens system, the number of optical sheets can be reduced. Further, by adopting the back-light unit of the turning lens system, the V-shaped bright line and linear unevenness are apt to occur. However, by disposing the prisms 23q and the prisms 523i (or the embossed patterns 523i) on the light guide plate 22 (light guide 23), occurrence of the V-shaped bright line and linear unevenness can be effectively suppressed.

Other structures and effects of the fifth embodiment are the same as those of the first embodiment.

Sixth Embodiment

Figure 48:
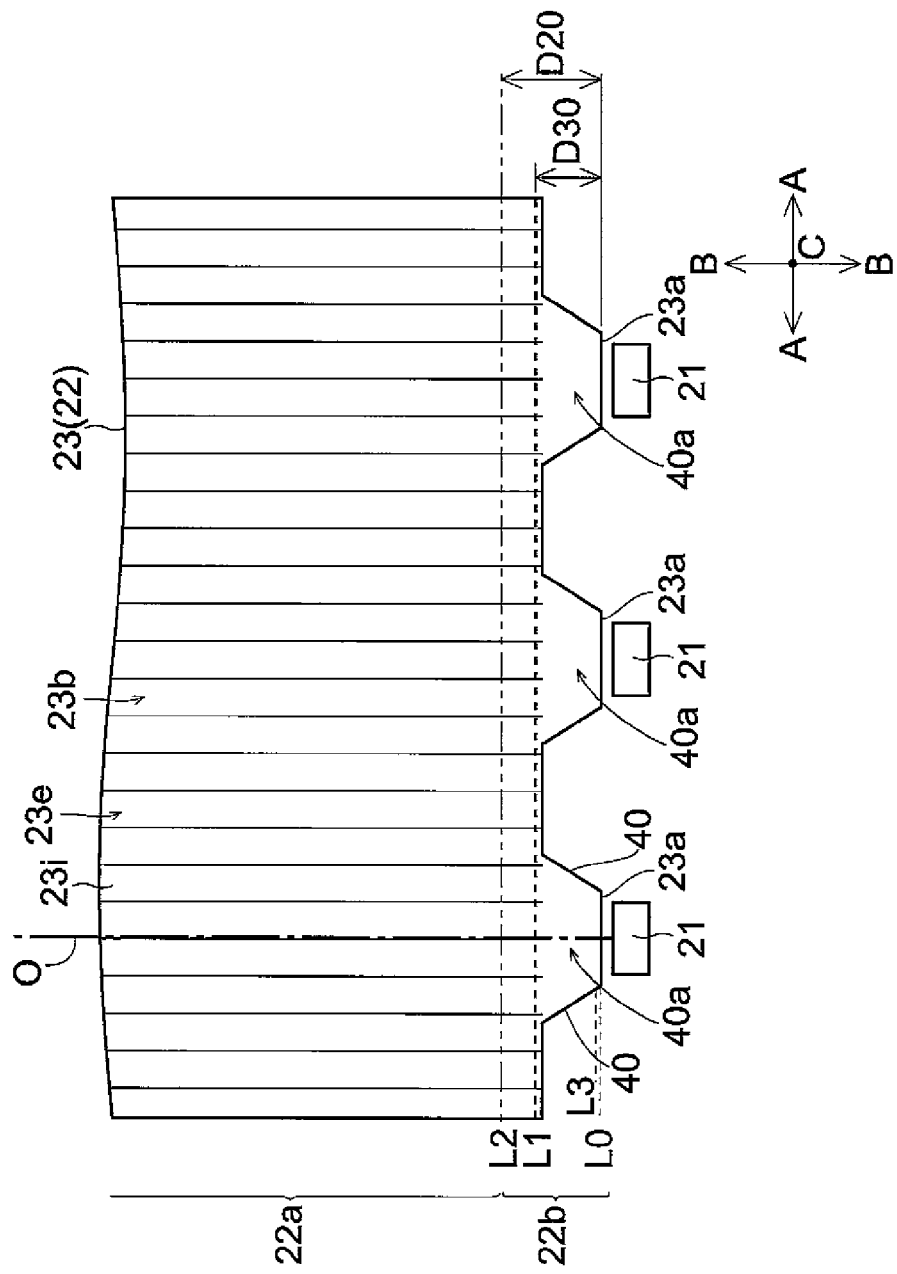
FIG. 48 is a plan view schematically illustrating a part of a back-light unit according to a sixth embodiment of the present invention.

FIG. 48 is a plan view schematically illustrating a part of a back-light unit according to a sixth embodiment of the present invention. Next, with reference to FIGS. 3, 7, and 48, the back-light unit according to the sixth embodiment of the present invention is described. Note that in the diagrams, corresponding components are denoted by the same numeral so that overlapping description is appropriately omitted.

In the sixth embodiment, as illustrated in FIG. 48, in the structure of the first embodiment, a trapezoidal prism 40a is formed in the end portion of the light guide plate 22 (light guide 23) (end portion on the LED 21 side). In other words, in the sixth embodiment, the end region 22b of the light guide 23 is formed on the trapezoidal prism 40*a*. The trapezoidal prism 40*a* is formed integrally with the light guide plate 22, and an oblique side of the trapezoid viewed in a plan view corresponds to the inclined surface 40. In other words, the trapezoidal prism 40*a* including the inclined surface 40 is formed in the end portion of the light guide plate 22. In addition, the pair of inclined surfaces 40 (oblique sides) are symmetrical with reference to the optical axis O. Note that the inclined surfaces 40 are formed substantially perpendicular to the light emitting surface 23*b* or the rear surface 23*c* of the light guide 23. In addition, the inclined surfaces 40 are formed to extend from the light incidence surface 23*a* in the direction inclined to the optical axis O. Further, the inclined surfaces 40 are formed to reflect the light R2 entering from the LED 21 to the light guide plate 22 in the direction of approaching the optical axis O (in the direction of decreasing the angle with the optical axis O). In other words, the inclined surfaces 40 reflect the light R2 emitted in the direction of the V-shaped bright line so as to change the light angle distribution in the horizontal direction (lateral direction).

In addition, the trapezoidal prisms 40*a* are formed in the region S1 (on the LED 21 side as illustrated in FIG. 7) in which the prisms 23*e* are not formed in the end region 22*b*.

In the back-light unit of the sixth embodiment configured as described above, the light that enters through the light incidence surface 23*a* and is emitted in the V-shaped bright line direction is reflected by the inclined surfaces 40 of the trapezoidal prisms 40*a* so as to change the light angle distribution in the horizontal direction (lateral direction). Thus, the light entering the incidence surface 23*a* becomes light that does not become the V-shaped bright line component so as to propagate in the light guide plate 22. Therefore, occurrence of the V-shaped bright line is suppressed.

Further, because the trapezoidal prisms 40*a* have the same function as the prisms 23*q* (see FIG. 3) described in the first embodiment, it is possible to adopt a structure in which the trapezoidal prisms 40*a* are disposed instead of the prisms 23*q*. In addition, it is possible to adopt a structure in which the prisms 23*q* are further disposed in addition to the trapezoidal prisms 40*a*.

Other structures of the sixth embodiment are the same as those of the first embodiment. In addition, effects of the sixth embodiment are the same as those of the first embodiment.

In addition, the trapezoidal prisms 40*a* may be formed until the beginning position L2 of the light emitting region 22*a*. In addition, in order to suppress the V-shaped bright line, the inclined surfaces 40 should be provided. Therefore, instead of forming the trapezoidal prisms 40*a*, for example, it is possible to form incision portions in the end portion of the light guide plate 22 on the LED 21 side (in a vicinity of the light incidence surface 23*a*). By forming the incision portions, inclined surfaces made of air interface (similar to the inclined surfaces 40 of the trapezoidal prism 40*a*) are formed. Therefore, occurrence of the V-shaped bright line can be suppressed by the inclined surfaces. Note that it is preferred that reflection treatment such as mirror treatment should be processed on the outer surface of the inclined surface.

Note that the embodiments disclosed above are examples in every point and should not be interpreted as a limitation. The scope of the present invention is defined not by the above description of embodiments but by the claims, and further includes all modifications within the meanings and scopes equivalent to the claims.

For instance, in the first to sixth embodiments, there are described the examples where the illumination device is applied to the back-light unit. However, the present invention is not limited to this, but can be applied to other illumination device than the back-light unit. For instance, the illumination device of the present invention can be applied to a general illumination such as a room illumination or an outdoor lamp.

In addition, in the first to sixth embodiments, there are described the examples where the present invention is applied to the sheetless backlight or the backlight of the turning lens system. However, the present invention is not limited to this, and the present invention can be applied to a back-light unit of other system than the above-mentioned system.

In addition, in the first to sixth embodiments, there are described the examples where the display panel and the display device are respectively applied to the liquid crystal display panel and the liquid crystal display device. However, the present invention is not limited to this, but may be applied to a display panel and a display device other than the liquid crystal display panel and the liquid crystal display device.

Figure 49:
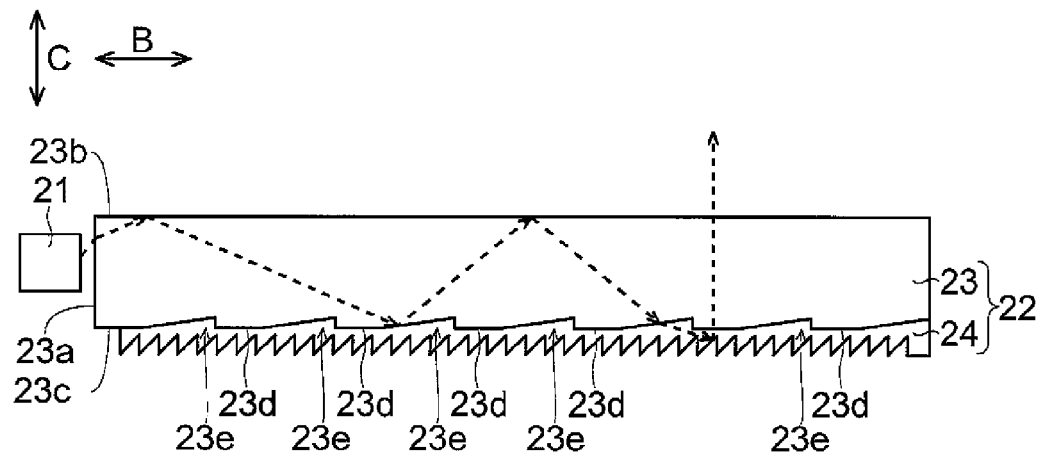
FIG. 49 is a cross-sectional view schematically illustrating a back-light unit according to a first modified example of the present invention.
Figure 50:
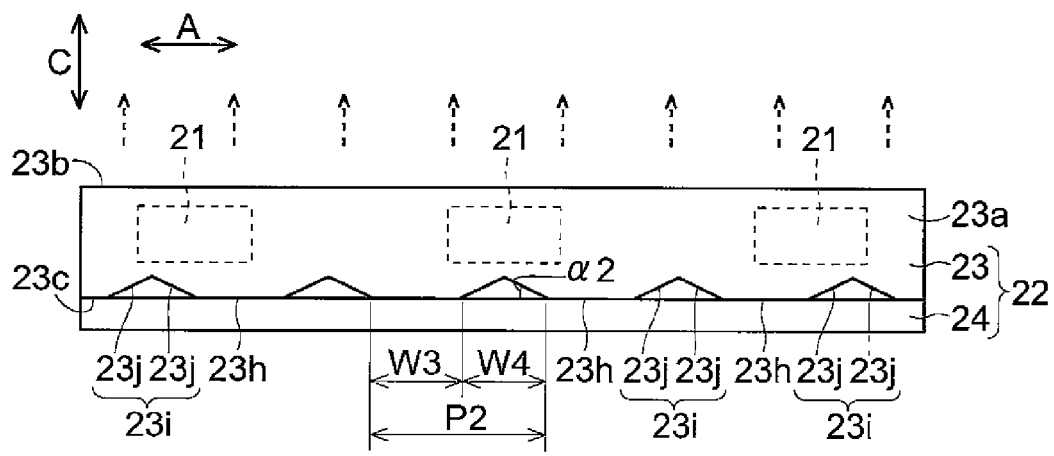
FIG. 50 is a cross-sectional view schematically illustrating a back-light unit according to a second modified example of the present invention.

In addition, in the embodiment described above, there is described the example where the prisms (prisms 23*e*) for gradually decreasing the incident angle of the light from the LED to the rear surface of the light guide and the prisms (prisms 23*i*) for dispersing the light in the lateral direction are formed on the light emitting surface (front surface) of the light guide. However, the present invention is not limited to this, and the prisms may be formed on a place other than the light emitting surface (front surface) of the light guide. For instance, as illustrated in FIG. 49, the prisms 23*e* for gradually decreasing the incident angle of the light from the LED 21 to the rear surface 23*c* of the light guide 23 may be formed on the rear surface 23*c* of the light guide 23. In addition, as illustrated in FIG. 50, the prisms 23*i* for dispersing the light in the lateral direction may be formed on the rear surface 23*c* of the light guide 23. Note that both the prisms 23*e* and the prisms 23*i* may be formed on the rear surface 23*c* of the light guide 23, or either one of them may be formed on the rear surface 23*c* of the light guide 23.

Further, in the embodiment described above, there is described the example where the prisms (prisms 23*q*) formed in the end region of the light guide are formed on the light emitting surface (front surface) of the light guide. However, the present invention is not limited to this, and the prisms (prisms 23*q*) in the end region may be formed on the rear surface of the light guide (interface with the low refractive layer). In addition, the prisms 23*q* and the prisms 23*i* may be formed in the same surface as described above in the embodiment, or may be formed in different surfaces unlike the embodiment described above.

In addition, in the embodiment described above, the prisms (prisms 23*e*, prisms 23*i*, and prisms 23*q*) formed on the light guide may be formed on either side (either one of the front surface and the rear surface) of the light guide, or may be formed on both sides (the front surface and the rear surface) of the light guide.

Further, in the embodiment described above, a material having a different refractive index may be disposed between the light guide (having the refractive index n1) and the low refractive layer (having the refractive index n2). In this case, when the layer disposed between them has a refractive index (n5), it is preferred that the refractive index (n5) should satisfy n2<n5≤n1.

Figure 51:
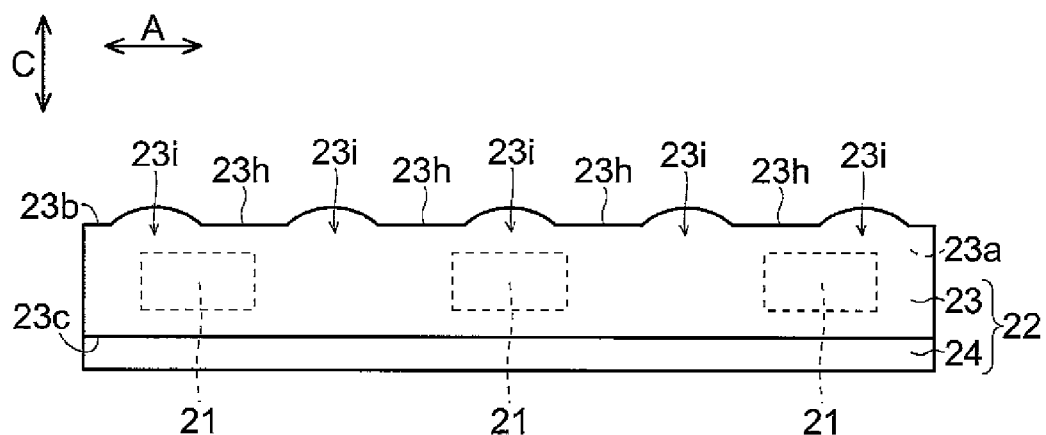
FIG. 51 is a cross-sectional view schematically illustrating a back-light unit according to a third modified example of the present invention.
Figure 52:
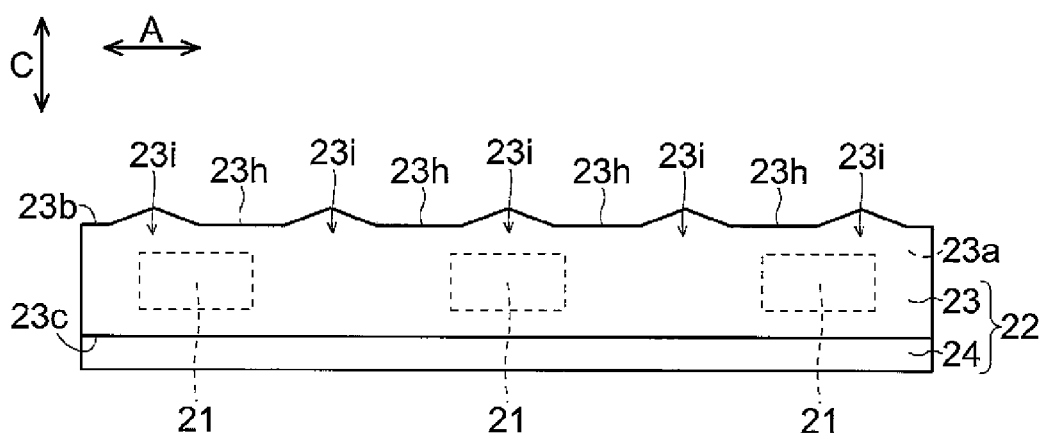
FIG. 52 is a cross-sectional view schematically illustrating a back-light unit according to a fourth modified example of the present invention.

In addition, in the embodiment described above, there is described the example where the prisms (prisms 23*e*) for gradually decreasing the incident angle of the light from the LED to the rear surface of the light guide and the prisms (prisms 23*i*) for dispersing the light in the lateral direction are respectively formed to have a concave shape. However, the present invention is not limited to this, and the prisms may be formed to have a shape other than the concave shape (for example, a convex shape). An example of the prisms formed in the light emitting region for dispersing the light in the lateral direction is described below. For instance, as illustrated in FIGS. 51 and 52, the prisms 23i can be formed to have an upward convex shape. In this case, as illustrated in FIG. 51, the prisms 23i having a convex shape may be formed to have an arcuate cross section, for example. In addition, as illustrated in FIG. 52, the prisms 23i having a convex shape may be formed to have a triangular cross section, for example. In addition, the cross section may have a shape such as an ellipse other than the above-mentioned shape. Similarly, the prisms (prisms 23e) for gradually decreasing the incident angle of the light from the LED to the rear surface of the light guide and the prisms (prisms 23q) formed in the end region may also have various shapes such as a convex shape.

In addition, in the embodiment described above, there is described the example where the prisms (prisms 23q) in the end region and the prisms (prisms 23i) for dispersing the light in the lateral direction are formed to extend in the direction substantially perpendicular to the light incidence surface. However, the present invention is not limited to this, and the other shape may be adopted as long as the shape has the same function as described above.

In addition, in the embodiment described above, there is described the example where the prisms (prisms 23i) for dispersing the light in the lateral direction are formed to begin from the end region. However, the prisms 23i may be formed to begin from the light emitting region. However, it is preferred that the prisms 23i are also formed to begin from the end region before the light emitting region.

Further, in the embodiment described above, there is described the example where the prisms 23q are formed in the end region of the light guide. However, the present invention is not limited to this, and it is possible to adopt a structure in which the prisms 23q are not formed (D10=0 (D10=L0)). In this case, the region in which the prisms 23e are not formed in the end region may be a flat surface state (to be the flat surface portion). In addition, other optical pattern may be formed in this region.

In addition, in the embodiment described above, there is described the example where the prisms (prisms 24b (25b)) formed on the rear surface of the light guide plate begin from a position closer to the light source (the LED side) than the prisms 23e. However, the present invention is not limited to this, and the prisms 24b (25b) may be formed to begin from the same position as the prism 23e or a position closer to the light emitting region than the prism 23e. However, from a viewpoint of suppressing unevenness of luminance, it is preferred that the prisms 24b (25b) should be formed to begin from a position closer to the light incidence surface.

Further, in the embodiment described above, it is possible to adopt a structure in which a reflective plate is disposed on the rear side of the light guide plate. Although the structure of the reflective plate is not limited in particular, it is preferred to constitute by using, for example, a reflective plate made of a dielectric multi-film mirror, a reflective plate on which silver is coated, or a reflective plate made of white color PET resin. In addition, it is possible to adopt a structure in which a diffusion plate for diffusing light is disposed between the light guide plate and the display panel.

In addition, in the embodiment described above, there is described the example where the LED is used as the light source. However, the present invention is not limited to this, and a light emission element other than the LED may be used as the light source. Further, a light source other than the light emission element (for example, a CCFL) may be used. In addition, it is sufficient that the light source is disposed at least on one side of the back-light unit (light guide).

In addition, the values such as angles and widths specified in the embodiments described above are merely examples, and the angles and the widths may have the values different from those of the embodiments described above.

In addition, in the embodiment described above, there is described the example where the prisms are formed by using the plat plate mold and the quartz substrate when the light guide plate is formed. However, the present invention is not limited to this, and it is possible to form the prisms by using a roll-like mold and the quartz substrate when the light guide plate is formed.

In addition, in the embodiment described above, there is described the example where the thermal imprinting method is used for forming the prisms on the light guide, and afterward the low refractive layer is formed on the light guide. However, the present invention is not limited to this, and it is possible to form the prisms after forming the low refractive layer on the light guide, for example.

Figure 53:
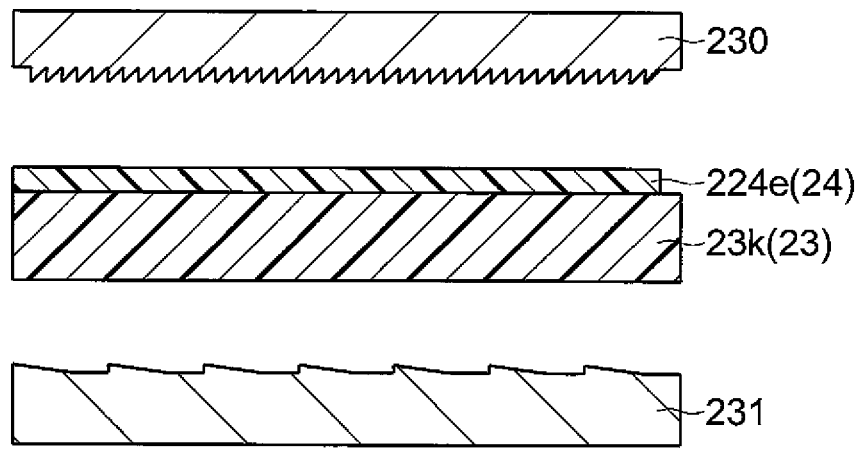
FIG. 53 is a cross-sectional view for explaining another manufacturing process of the light guide plate of the back-light unit.
Figure 54:
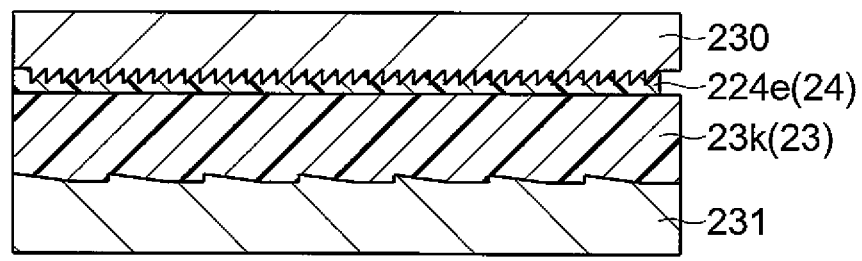
FIG. 54 is a cross-sectional view for explaining another manufacturing process of the light guide plate of the back-light unit.
Figure 55:
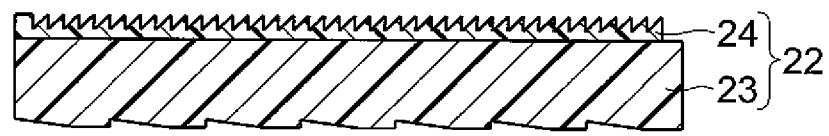
FIG. 55 is a cross-sectional view for explaining another manufacturing process of the light guide plate of the back-light unit.

Specifically, first, as illustrated in FIG. 53, a film material 224e to be the low refractive layer 24 is formed on the film material 23k to be the light guide 23. Next, the film materials 23k and 224e are disposed between an upper mold 230 and a lower mold 231. Further, as illustrated in FIG. 54, the film materials 23k and 224e are heated and pressed by the upper mold 230 and the lower mold 231. Thus, the film materials 23k and 224e are formed to have a desired shape. After that, the film materials 23k and 224e are separated from the upper mold 230 and the lower mold 231 and are cooled, and then are divided into pieces, so that the light guide plate 22 including the light guide 23 and the low refractive layer 24 is obtained as illustrated in FIG. 55.

If the prisms are formed on the rear surface of the light guide, a sheet with the prisms 23e and the prisms 23i formed on a surface to the interface with the low refractive layer (film material having a refractive index (n11)) and a sheet on which the prisms 24b (25b) are formed (film material having a refractive index (n13)) are glued with a sheet to be the low refractive layer (film material having a refractive index (n12)), for example. In this case, a relationship among the refractive indexes of the sheets satisfy $n12<n13 \leq n11$.

In addition, in the third embodiment described above, there is described the example where the reflection layer is added to the structure of the first embodiment. However, the present invention is not limited to this, and it is possible to add the reflection layer described in the third embodiment to the structure of the fourth or fifth embodiment.

In addition, in the fifth embodiment described above, there is described the example where the single-sided prism sheet having the prism surface on one side is used. However, the prism sheet used for the back-light unit may be, for example, a double-sided prism sheet other than the single-sided prism sheet. In this case, for example, it is possible to use a prism sheet having the prism surface on the light guide plate side and the micro lenses or the like formed on the opposite side (upper surface).

Further, in the sixth embodiment described above, there is described the example where the trapezoidal prisms or the like (inclined surfaces) are formed on the structure of the first embodiment. However, the present invention is not limited to this, and the structure described above in the sixth embodiment may be applied to the structures of the second to fifth embodiments.

Further, embodiments obtained by appropriately combining the techniques disclosed above are also included in the technical scope of the present invention.

EXPLANATION OF NUMERALS 1 liquid crystal display device (display device)
10 liquid crystal display panel (display panel)
11 active matrix substrate
12 opposing substrate
13 polarizing film
20 back-light unit (illumination device)
21 LED (light source)
22 light guide plate (light guide member)
22a light emitting region
22b end region
23 light guide
23a light incidence surface (light entrance surface)
23b light emitting surface, front surface (upper surface)
23c rear surface (under surface)
23d flat surface portion
23e prism (first reflection portion)
23f inclined surface
23g vertical surface
23h flat surface portion
23i prism (third reflection portion)
23j inclined surface
23p flat surface portion
23q prism (fourth reflection portion)
23r inclined surface
24 low refractive layer
24a rear surface
24b prism (second reflection portion)
24c inclined surface
25 prism layer
25b prism (second reflection portion)
30 reflection layer

The invention claimed is:

1. An illumination device comprising:
a light source; and
a light guide that guides light from the light source, wherein
the light guide includes an incidence surface to which the light from the light source enters, an end region on the light source side, and a light emitting region disposed on a side opposite to the light source with respect to the end region,
a first reflection portion that reflects the light entering the light guide and a third reflection portion that expands light in a direction intersecting an incident direction of the light are disposed on the light emitting region of the light guide,
the first reflection portion begins from a position separated by a predetermined distance from the incidence surface in the end region, and
a fourth reflection portion that changes a propagation angle of light expanding in a direction intersecting the incident direction of the light more largely than the third reflection portion disposed in a region in the end region closer to the light source than the first reflection portion.

2. The illumination device according to claim 1, wherein a region in the end region closer to the light source than the first reflection portion has a structure different from the light emitting region.

3. The illumination device according to claim 1, wherein
a second reflection portion is disposed on the rear side of the light guide, and
a beginning position of the second reflection portion is closer to the light source than the first reflection portion.

4. The illumination device according to claim 1, wherein the third reflection portion and the fourth reflection portion are continuously formed.

5. The illumination device according to claim 4, wherein a reflection layer for reflecting light emitted from the fourth reflection portion externally is disposed on the fourth reflection portion.

6. The illumination device according to claim 5, wherein the reflection layer is disposed to cover at least a part of the fourth reflection portion.

7. The illumination device according to claim 3, comprising a light guide member including the light guide and a low refractive layer having a refractive index lower than that of the light guide, wherein
the low refractive layer is disposed on a rear surface of the light guide without an air layer between them,
a plurality of the first reflection portions are disposed on one of a front surface and the rear surface of the light guide, and
a plurality of the second reflection portions are disposed on the rear surface of the light guide member.

8. The illumination device according to claim 7, wherein
the first reflection portion has a function of gradually decreasing an incident angle of the light from the light source to the rear surface of the light guide, and
the second reflection portion has a function of totally reflecting the light from the light source to the front by an interface between the rear surface of the light guide member and the air layer.

9. The illumination device according to claim 1, further comprising an optical sheet having a prism surface, which is overlapped on the light guide, wherein
the optical sheet is disposed so that the prism surface faces the light guide.

10. The illumination device according to claim 1, wherein a front surface and a rear surface of the light guide are formed to be substantially parallel to each other.

11. A display device comprising:
the illumination device according to claim 1; and
a display panel which receives light the illumination device.

* * * * *